(12) United States Patent
Ferrara

(10) Patent No.: US 7,682,460 B2
(45) Date of Patent: Mar. 23, 2010

(54) CLEANING METHOD

(76) Inventor: Marcello Ferrara, viale Epipoli, 23 - 96100 Siracusa (IT)

( * ) Notice: Subject to any disclaimer, the term of this patent is extended or adjusted under 35 U.S.C. 154(b) by 1040 days.

(21) Appl. No.: 10/513,418

(22) PCT Filed: Jun. 10, 2003

(86) PCT No.: PCT/IT03/00359

§ 371 (c)(1),
(2), (4) Date: Nov. 4, 2004

(87) PCT Pub. No.: WO03/103863

PCT Pub. Date: Dec. 18, 2003

(65) Prior Publication Data

US 2005/0139238 A1 Jun. 30, 2005

(30) Foreign Application Priority Data

Jun. 10, 2002 (IT) .......................... ME2002A0007

(51) Int. Cl.
*B08B 7/04* (2006.01)
(52) U.S. Cl. .................. 134/10; 134/12; 134/22.1; 134/22.14; 134/22.19; 134/34; 134/40; 134/42
(58) Field of Classification Search .............. 134/10
See application file for complete search history.

(56) References Cited

U.S. PATENT DOCUMENTS

| | | | |
|---|---|---|---|
| 3,677,819 A * | 7/1972 | Thiel et al. ................... 134/2 |
| 4,810,397 A * | 3/1989 | Dvoracek ................... 508/267 |
| 5,425,814 A * | 6/1995 | Krajicek et al. ............. 134/22.1 |
| 5,540,784 A | 7/1996 | Ranes |
| 5,611,869 A * | 3/1997 | Hart ......................... 134/22.19 |
| 5,935,276 A * | 8/1999 | DeRosa et al. ................. 44/337 |
| 6,138,691 A | 10/2000 | Voloshin et al. |
| 6,273,102 B1 | 8/2001 | Kawakami et al. |
| 6,485,578 B1 | 11/2002 | Park et al. |
| 6,858,090 B2 * | 2/2005 | Hebert ......................... 134/13 |

FOREIGN PATENT DOCUMENTS

| | | |
|---|---|---|
| DE | 44 20 579 A1 | 12/1995 |
| FR | 2 815 639 | 4/2002 |
| GB | 2 361 282 A | 10/2001 |
| KR | 20010092131 | 10/2001 |

OTHER PUBLICATIONS

International Search Report corresponding to International Application No. PCT/IT03/00359 dated Mar. 11, 2003.

* cited by examiner

*Primary Examiner*—Peter A Hruskoci
(74) *Attorney, Agent, or Firm*—Smith, Gambrell & Russell, LLP

(57) ABSTRACT

The method for cleaning chemical process and hydrocarbon processing apparatuses is performed by establishing a closed flow circulation loop, under specific operating conditions and in the presence of hydrocarbon-based fluids. The cleaning method is monitored by performing chemical/physical analysis. After cleaning the apparatus(es) can be immediately inserted back into the process. An optional degassing step can also be performed, in case the apparatus(es) has to be disassembled for inspection of maintenance.

83 Claims, 9 Drawing Sheets

CLEANING METHOD

BACKGROUND OF THE INVENTION

This invention relates to a method for cleaning apparatus(es) of a chemical plant or hydrocarbon processing plant, wherein cleaning is performed by establishing a closed flow circulation loop.

In the chemical and the hydrocarbon processing industry (e.g. oil field, refining, petrochemical), cleaning of apparatus(es) occurs for different purposes such as maintenance and inspection, or for recovering the performance of said apparatus(es). Such apparatuses include, but are not limited to, heat exchangers, distillation columns, reactors, filters, pumps, heaters, pipelines, vessels, desalters, extractors, separators and the like. The cleaning operation is performed to remove contaminants, foulants, sludge, deposits and the like, which are detrimental both to the operation of the unit and to health and safety of the maintenance personnel.

Generally speaking, fouling of process apparatuses arises from deposition of heavy compounds. These heavy compounds have boiling point or a melting point>100° C. and generally result from degradation of fluids which are part of the process. Sometimes degradation can even lead to coke and coke-like deposits.

All the examples hereinafter reported are to be intended for the mere purpose of illustration and should not be construed as limiting the invention.

Hydrocarbon processing plants suffer from fouling of apparatus(es). Crude oil just as extracted even gives rise to such a problem. For example, oil-gas separators, distillation columns, heat exchangers, filters are subject to this phenomenon. All crude oil processing cycle, from refining to petrochemical plants, as well as energy industry, suffer this problem. When a processing apparatus is fouled, it has to be isolated from the process, emptied from fluids, degassed, disassembled and cleaned; then mounted again in the plant and inserted in the process. Therefore, fouling implies: a) energy efficiency reduction; b) production loss; c) maintenance work; d) waste disposal; e) airborne pollution generation; f) safety concerns; g) reduced environmental performance.

Cleaning of processing apparatus can also be performed during plant turnaround; in this case time for cleaning can be the limiting factor of turnaround duration, which will affect the economics of yearly production. In todays' state of the art, cleaning of apparatuses is performed after degassing in a specific way for each type of apparatus. Generally, washing with water high pressure jet (hydroblasting) is the common choice for cleaning. Finally, all the cleaning methods are time consuming, can be applied to a single apparatus at a time and can lead to apparatus damage (e.g. heat exchanger bundle is damaged upon extraction). Moreover they give rise to environmental and safety concerns, as waste and emissions are generated during the cleaning process and working personnel is exposed to chemical and mechanical risks.

As an exemplary illustration, todays technologies for cleaning heat exchangers in the hydrocarbon processing industry comprise the following operations: a) flushing; b) isolating the equipment from the process and blinding; c) removing the hydrocarbons; d) steaming out for gas and light hydrocarbons removal (degassing); e) unbolting; f) removing covers and distributor; g) extracting the bundle; h) transporting the bundle from plant to washing area; i) hydroblasting; j) transporting the bundle from washing area to plant; k) inserting the bundle; l) inserting new gaskets; m) installing covers and distributor; n) bolting; o) removing blinding; p) air removal and purging; q) inserting the apparatus in the process.

There have been some attempts in the art to develop a cleaning method which would improve the mechanical methods, but these have been unsatisfactory for industrial practices and needs.

Accordingly, there is a continued need in the art for an improved cleaning method, which can avoid all of these pitfalls.

SUMMARY OF THE INVENTION

The present invention provides a method for cleaning chemical process and hydrocarbon processing apparatuses, wherein cleaning is performed by establishing a closed flow circulation loop, under specific operating conditions and in the presence of hydrocarbon-based fluids. The cleaning method is monitored by performing chemical/physical analysis. After cleaning under present invention, the apparatus(es) can be immediately inserted back into the process. An optional degassing step can also be performed, in case the apparatus(es) has to be disassembled for inspection or maintenance.

DETAILED DESCRIPTION OF THE PREFERRED EMBODIMENTS

Figure 1:
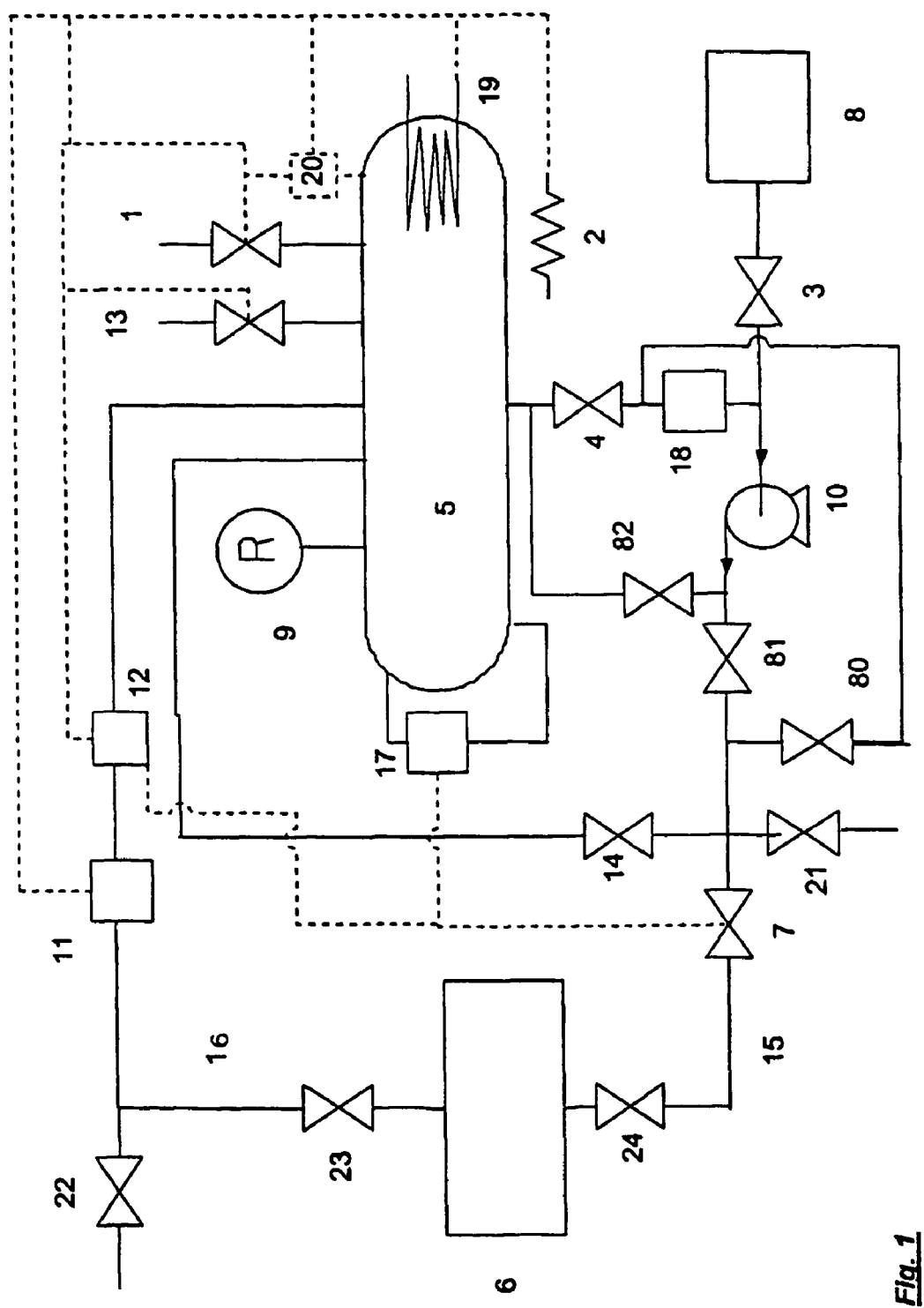
FIG. 1 reports a general layout of a plant for accomplishing the method under present invention.

In its preferred embodiment, the present invention relates to a method for cleaning chemical process and hydrocarbon process apparatus(es), wherein cleaning is performed by establishing a closed flow circulation loop of a hydrocarbon-based fluid. In another preferred embodiment, the present invention relates to a method for gas-freeing chemical process and hydrocarbon process apparatus(es), wherein degassing is performed after the cleaning steps by establishing a closed flow circulation loop of a water-based fluid.

By establishing a closed flow circulation loop of a hydrocarbon-based fluid under present invention, at temperature and pressure conditions under present invention, solubilization of heavy compounds like contaminants, foulants, sludge, coke and the like inside the apparatus is achieved. Such heavy compounds can be then easily removed by simply pumping them out. In such a way the apparatus is cleaned without the need of disassembling it, thus achieving an improvements on todays's state of the art.

The method of present invention comprises the steps of:
a) connecting the apparatus(es) to be cleaned to a plant essentially composed of: i) heating means, ii) a system for circulating a fluid, iii) a connection system for establishing a closed loop, iv) inlet/outlet for fluids, v) control means, vi) filtering means;
b) optionally isolating the apparatus(es) to be cleaned from other process apparatus(es);

c) establishing a closed flow circulation loop which effectively includes: i) the apparatus(es) to be cleaned, ii) heating means, iii) a system for circulating a fluid, iv) a connection system for establishing a closed loop, v) inlet/outlet for fluids, vi) control means, vii) filtering means;
d) filling the apparatus(es) with sufficient amount of a hydrocarbon-based fluid, in a way that any apparatus(es) included in the loop be full during subsequent circulation;
e) circulating through the loop the hydrocarbon-based fluid;
f) heating the circulating hydrocarbon-based fluid to a temperature comprised preferably between 100° C. and 600° C., most preferably between 150° C. and 500° C., still most preferably between 200° C. and 400° C.;
g) setting the pressure of the circulating hydrocarbon-based fluid to a value comprised preferably between 1 bar and 50 bar, most preferably between 10 bar and 50 bar, still most preferably between 25 bar and 50 bar;
h) circulating the hydrocarbon-based fluid for a time sufficient to clean the apparatus(es), comprised preferably between 20 minutes and 7 days, at temperature comprised between 100° C. and 600° C. and a pressure comprised between 1 bar and 50 bar;
i) optionally introducing a second hydrocarbon-based fluid to increase heavy compounds solubilization;
j) optionally circulating the hydrocarbon-based fluid(s) under conditions of temperature and pressure sufficient to maintain the fluid at near or above its critical point;
k) monitoring the status of cleaning operations, as to determine cleaning time, by performing chemical and/or physical analysis;
l) optionally reducing temperature and pressure of the circulating hydrocarbon-based fluid(s) in order to allow subsequent fluid discharge;
m) optionally removing the circulating hydrocarbon-based fluid(s), by pumping it out of the circulation loop or by draining or by displacement with a suitable fluid;
n) optionally recovering and reutilizing the hydrocarbon-based fluid(s);
o) optionally repeating the steps d) through n);
p) optionally degassing the apparatus(es) that has been cleaned, by introducing water in the closed loop, introducing water-soluble fluids and circulating the resulting solution.

Hydrocarbon-based fluid(s) under present invention can be of different type. Eventual recover and/or reuse of cleaning fluid, containing a hydrocarbon-based fluid(s) under present invention together with heavy compounds solubilized in the apparatus that has been cleaned, can be done in different ways, as for example: a) as blending component for fuel oil; b) reprocessing it together with crude oil; c) pump it to slop circuit; d) pump it in a part of the chemical/hydrocarbon processing plant to which belongs the apparatus(es) that has been cleaned; e) pump it to another chemical/hydrocarbon processing plant. A further advantage of reusing cleaning fluid is, beside environmental considerations, to recover hydrocarbon-based fluid(s) under present invention.

In another preferred embodiment, present invention relates to a method for cleaning heat exchangers.

In still another preferred embodiment, present invention relates to a method for cleaning process heaters.

In a further preferred embodiment, present invention relates to a method for cleaning reactors.

In another preferred embodiment, present invention relates to a method for cleaning distillation columns.

In still another preferred embodiment, present invention relates to a method for cleaning lines, filters, vessels and pumps.

In a further preferred embodiment, present invention relates to a method for increasing furnace inlet temperature of an hydrocarbon processing (HP) plant.

As a matter of fact furnaces in a HP plant are generally located downstream of heat exchangers, which have the function of increasing as much as possible furnace inlet temperature (FIT). If these heat exchangers fouls a FIT decrease will follow, with related energy, economic and environmental losses. Cleaning of heat exchangers under present invention allows increasing FIT without extracting the bundle(s) of heat exchanger(s), which can, among the others, cause production losses. By cleaning any apparatus(es) under present invention the apparatus(es) and/or the HP plant can immediately be re-started without any particular procedure, as cleaning is performed in the hydrocarbon phase, without disassembling the apparatus(es).

As used in present invention the term "hydrocarbon-based fluid(s)" can be indifferently referred to a hydrocarbon-based fluid or any mixture of hydrocarbon-based fluids under present invention.

The method of present invention is accomplished by connecting the apparatus(es) to be cleaned to a plant essentially composed of: i) heating means, ii) a system for circulating a fluid, iii) a connection system for establishing a closed loop, iv) inlet/outlet for fluids, v) control means, vi) filtering means.

An exemplary layout of such a plant, as reported in FIG. 1, consists of a metallic vessel 5, made up of any material, form and volume suitable for the scope, preferably an horizontal tank with rounded bottoms, capable of being effectively submitted to a temperature between 100° C. and 600° C. and a pressure between 1 bar and 50 bar. Obviously, all the other parts of the plant have to be capable of being effectively submitted to a temperature between 100° C. and 600° C. and a pressure between 1 bar and 50 bar. Vessel 5 is connected in its lower part to a filter 18, a valve 4 and a pump 10 which discharges a hydrocarbon-based fluid(s) under present invention to the apparatus(es) to be cleaned 6 through a line 15. The piping of the plant under present invention is closed via line 16 which connects the apparatus(es) to be cleaned 6 back to the vessel 5. Hydrocarbon-based fluid(s) under present invention, contained e.g. in a vessel 8, is introduced by opening valves 3, 81 and 14 and closing valves 7 and 4; alternatively, it can be introduced by closing valves 4 and 14 and opening valves 3, 81, 7, 24, 23. Vessel 5 is heated by means of a suitable heater, which can be inside 19 or outside 2 vessel 5 and is preferably selected from the group consisting of: electrical resistance, fuel heater, heat exchanger. In the case an external heating medium is the choice, this will be preferably selected from the group consisting of: steam, organic heat transfer fluid (diathermic oil). A temperature controller 11 sends a signal to the heater 2 or 19. Such signal can act directly on the heater, as the case of an electric resistance, or indirectly, e.g. by opening the inlet valve of the external heating medium. A pressure controller 12 controls valve 7 on the discharge side of pump 10, in order to regulate pressure inside the loop at a definite value, and controls inert gas inlet valve 1, preferably nitrogen, and pressure valve 13. In the case pressure would exceed set-up value, pressure relief valve 9, set preferably on vessel 5, preferably connected with a flare or blowdown system, will assure safety from overpressure. In any case, when the plant reaches pressure set-up value, the heater 2 will be turned off. A level controller 17 will assure that pump 10 is working under liquid head in vessel 5; for such a purpose it will control valve 7. Vessel 5 is hold under inert gas, preferably nitrogen, pressure by means of inlet valve 1; inert gas inlet pressure has to be slightly higher than the one of vessel 5. Inlet of inert gas is controlled by means of pressure controller 12, in order to replace with inert gas the free space left from hydrocarbon-based fluid(s) in the vessel, and/or by means of explosivity and/or oxygen analyzers 20 to assure the system from being out of explosivity limits. Explosivity and/or oxygen analyzers will send a signal which will stop all the plant, together with acoustic and visual alarms, in case set-up limits will be exceeded. Valve 21 is an auxiliary exit, while valve 22 is an auxiliary inlet. Valves 23 and 24 allow the plant to be connected or disconnected from the apparatus(es) to be cleaned. Sensors of the controllers 11, 12 and 20 can be inserted preferably in vessel 5. Discharge line 15 and return line 16 can be fixed or mobile, of any suitable type, included flexible hoses, preferably of the metallic type. In an exemplary application of the method of present invention, the plant is connected to the apparatus(es) to be cleaned by means of valves 23 and 24, which could also be part of such apparatus(es), in order to establish a closed loop. A first hydrocarbon-based fluid is then introduced into the closed loop by opening valve 22; then valves 81, 4, 7, 24, 23 are opened to allow circulation. When the closed loop is full, valve 22 is closed. Then valve 3 is opened to allow introduction of a second hydrocarbon-based fluid(s) under present invention, and valves 21 and/or 22 are opened to allow fluid displacement. Once the second hydrocarbon-based fluid(s) has been pumped into the loop, valve 3, 21 and/or 22 are closed and pump 10 is started-up to perform fluid circulation, then heater 19 and/or 2 are turned on. The circulation flowrate can be determined by the minimum diameter of the inlet/outlet lines of the apparatus(es) to be cleaned. During circulation the flow can be reversed by closing valves 81, 4 and opening valves 80, 82.

All electric connections, switches, actuators, controllers and any apparatus for controlling and monitoring plant operations, included a Distributed Control System, will be inserted in a suitable container. Eventually, a remote control can also be realized. All the plant units, materials, construction codes, electrical connections, and any part of the plant will have to satisfy all the regulations in force for the area wherein the plant is operating, included the ones for preventing fires or explosions. Mechanical connections among the parts can be of any suitable type, e.g., flanged, welded, screwed, with rapid connections, etc.

The plant reported in FIG. 1 can be a mobile unit, eventually a skid mounted one, in that it is not a part of the plant which contains the apparatus(es) to be cleaned, therefore it can be disconnected from the apparatus(es) to be cleaned, by closing valves 23 and 24, and then connected to another apparatus(es) to perform its cleaning.

Figure 8:
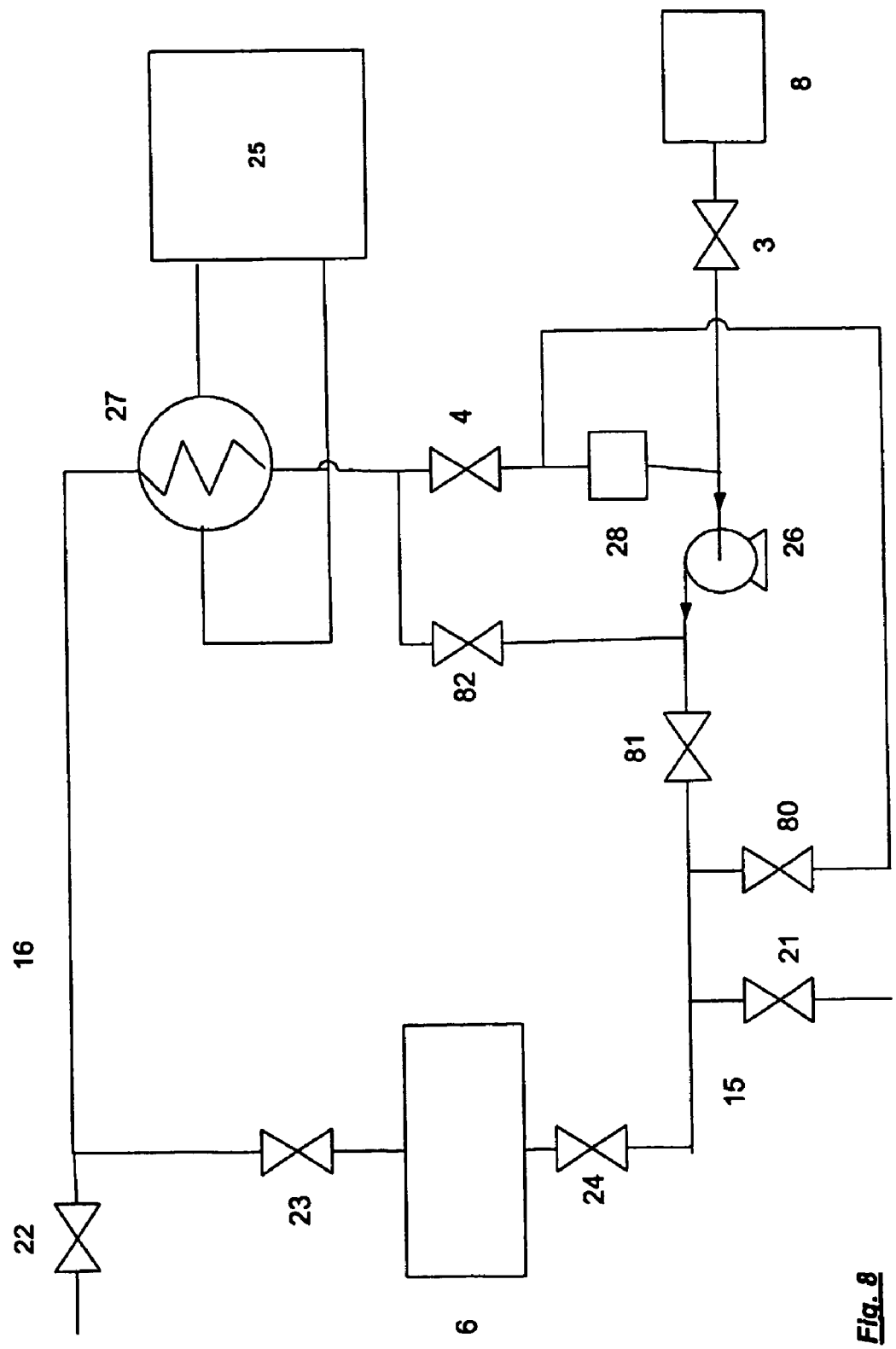
FIGS. 8, 9 report alternative layouts of a plant for accomplishing the method under present invention.

Another exemplary layout of a plant for accomplishing the method of present invention is reported on FIG. 8. In such a layout the heating system consists of a heat exchanger 27 connected on one side, e.g. on the shell side, with an external heating source 25 selected from the group of: i) steam, ii) a fluid with a temperature>100° C., iii) a plant according to FIG. 1, wherein flows an organic heat transfer fluid or a steam producing fluid. Apparatus(es) to be cleaned 6 is connected to the other side of heat exchanger 27, e.g. in the tube side, in order to establish a closed loop; hydrocarbon-based fluid(s) under present invention, contained in a vessel 8, is introduced in any point of the closed loop.

Circulation pump 26 performs circulation of hydrocarbon-based fluid(s) and can supply pressure to the system. The solids on the circulating fluid are trapped by means of a filter 28. Flow reversion is achieved by means of valves 80, 81,82, 4.

In some cases, to accomplish the method of present invention, it is not necessary to connect a mobile plant like those of FIGS. 1 and 8, but, always under the method of present invention, it is sufficient to establish a closed loop directly in the chemical/hydrocarbon processing plant which contains the apparatus(es) to be cleaned, provided such closed loop contains a heating medium and/or a heater. This can be the case of hydrocarbon processing plants, e.g., oil-field, refining and petrochemicals plants. In such cases it will be sufficient to establish a closed flow circulation loop inside the hydrocarbon processing plant which contains the apparatus(es) to be cleaned, introducing hydrocarbon-based fluid(s) under present invention, set temperature and pressure inside the loop according to the values of present invention, perform circulation and optionally perform recover/reuse of cleaning fluid(s).

A plant to accomplish the method of present invention is therefore also the same chemical/hydrocarbon processing plant which contains the apparatus(es) to be cleaned, connected in way of establishing a closed loop with apparatus(es) to be cleaned. In some cases the heating means can be part of a different chemical/hydrocarbon processing plant, wherein such heating means can be connected in any suitable way to the chemical/hydrocarbon processing plant which contains the apparatus(es) to be cleaned, in order to establish a closed flow circulation loop.

The heating means to establish suitable temperature inside the loop can be preferably selected from the following group: i) fuel heater; ii) steam reboiler; iii) organic heat transfer fluid heater or reboiler; iv) heat exchanger; v) electric heater; vi) steam; vii) organic heat transfer fluid; viii) a fluid having a temperature>100 C.

Figure 2:
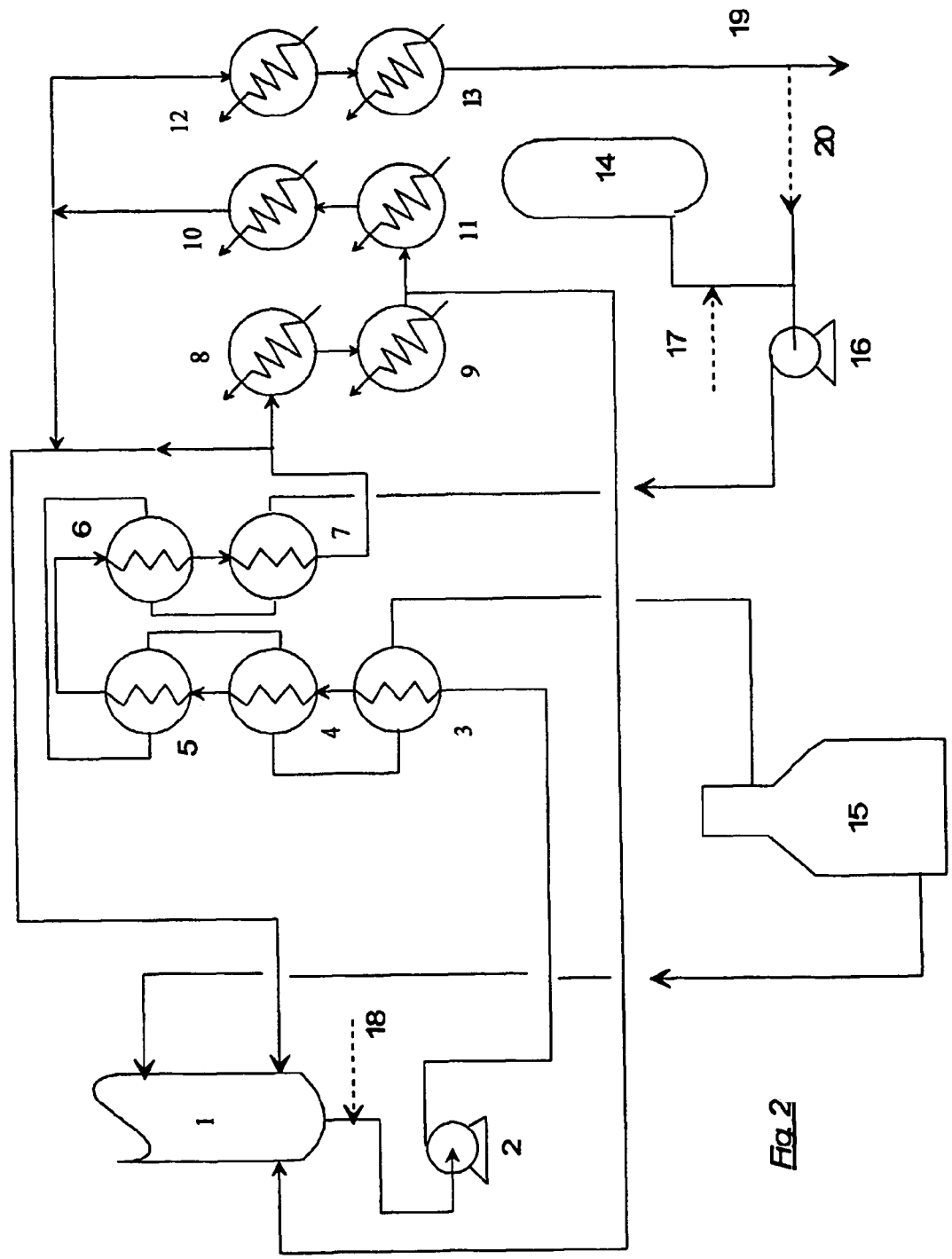
FIG. 2 reports the applicative example of the cleaning of a Visbreaker plant bottom circuit.

FIG. 2 reports an exemplary industrial application of present invention for a Visbreaker Unit, normally installed in a crude oil refinery. During normal operation, plant feedstock (Topping and/or Vacuum residues) is stocked in a surge drum 14 and by means of a pump 16 flows through the heat exchangers 7, 6, 5, 4, 3 and hence in the heater 15 and in the distillation column 1; from the bottom of this column, by means of a pump 2, distillation residue, after transferring its heat to heat exchangers 3, 4, 5, 6, 7, 8, 9, 10, 11, 12, 13, is sent to storage by means of a line 19. In cases wherein Visbreaker Unit should have no sufficient feedstock to run at minimum design capacity, there is the possibility of circulating the residue by means of line 20; in such a way starting-up of the Visbreaker will be much quicker as compared to a plant shutdown. Alternatively, line 20 can be utilized during start-up, until product exiting the plant satisfy their specifications. Line 20 has for Visbreaker only the functions described hereinabove and is never utilized during shutdown. During Visbreaker shutdown, before apparatuses are set out of service for cleaning, a flushing with gas oil is performed. In such a case the surge drum 14 is filled up with gas oil, which flows through the plant and exits it via line 19. In such an operation gas oil enters and exits the plant without establishing any circulation loop; flushing is therefore a once-through operation, which normally lasts 1-4 hours. Flushing is an operation which comprises the following steps: i) pump a light hydrocarbon, preferably gas oil, at the beginning of plant battery limits; ii) immediately discharge the light hydrocarbon, once it reaches the end of plant battery limits; iii) send the light hydrocarbon to a storage tank. During flushing no circulation on a closed loop is established inside the plant. Flushing has the only purpose of replacing heavy hydrocarbons with lighter ones, which flow at ambient temperature, in order to avoid blocking of heavy hydrocarbons inside the plant (which would not flow, once the plant is cooled down and shut down). For the same purpose, flushing is also performed before apparatus(es) mechanical cleaning. Flushing has no or little effect on fouling/deposits removal from the plant apparatuses: as a matter of facts, after flushing the apparatuses to be cleaned are emptied from hydrocarbons, steamed out (in order to remove flammable hydrocarbons), disassembled and finally mechanically cleaned.

As an exemplary industrial application of the method of present invention, cleaning of Vibreaker bottom exchangers comprises the following steps:
1. inserting line 20 for establishing a closed flow circulation loop;
2. filling said closed loop with a first hydrocarbon-based fluid, preferably selected from the following group: gasoline, kerosene, gas oil, Light Cycle Oil, benzene, toluene, xylene, and the like;
3. introducing in the closed loop, e.g. in point 17 or 18, a second hydrocarbon-based fluid(s) under present invention;
4. heating up the circulating fluid at a temperature preferably comprised between 100° C. and 500° C., most preferably between 150° C. and 400° C., still most preferably between 150° C. and 250° C.;
6. setting the pressure of the circulating fluid, at pump discharge, to a value comprised preferably between 1 bar and 50 bar, most preferably between 10 bar and 50 bar, still most preferably between 25 bar and 50 bar;
7. circulating the fluid by means of pumps 16 and 2, at a flowrate as for normal operation for such pumps, for a time sufficient to clean the apparatus(es), comprised preferably between 20 minutes and 7 days, at temperature comprised between 100° C. and 600° C. and a pressure comprised between 1 bar and 50 bar;
8. optionally setting temperature and pressure inside circulation loop as to reach near critical or, preferably, supercritical conditions of hydrocarbon-based fluid(s) under present invention;
9. monitoring the status of cleaning operations, as to determine cleaning time, by performing chemical/physical analysis;
10. optionally reducing temperature and pressure of the circulating fluid in order to allow subsequent fluid discharge;
11. removing the circulating fluid;
12. optionally recovering and reutilizing the fluid;
13. optionally repeating the steps 2 through 12;
14. optionally degassing the apparatus(es) that has been cleaned, under the method of present invention.

Cleaning under present invention will be terminated when monitoring, as defined hereinafter, will give timely indications. At this point heat exchangers, pumps, column bottom, lines and all the surfaces that have been contacted with the circulating fluid will be free from heavy hydrocarbons deposits. If Visbreaker has to start-up it will be no necessary to disassemble or open the apparatus(es) for cleaning. If opening of the apparatus(es) is dictated by maintenance or inspection jobs, it can be convenient to add the following steps for degassing the plant:
15. filling with water the closed flow circulation loop;
16. introducing a water-soluble fluid under present method;
17. heating up the circulating water solution at a temperature preferably comprised between 60° C. and 150° C., most preferably between 80° C. and 130° C., still most preferably between 90° C. and 120° C.;
18. setting the pressure of the circulating water solution to a value comprised preferably between 1 bar and 50 bar, most preferably between 1 bar and 25 bar, still most preferably between 1 bar and 10 bar;
19. circulating the fluid by means of pumps 16 and 2 for a time sufficient to clean the apparatus(es), comprised preferably between 20 minutes and 7 days, at temperature comprised between 60° C. and 150° C. and a pressure comprised between 1 bar and 10 bar;
20. monitoring the status of cleaning operations, as to determine cleaning time, by evaluating total hydrocarbon content in the circulating water phase;
21. reducing temperature and pressure of the circulating fluid in order to allow subsequent fluid discharge;
22. removing the circulating fluid, by pumping it out of the circulation loop;
23. optionally recovering and reutilizing the fluid;
24. optionally repeating the steps 15 through 23;
25. optionally repeating of steps 15 and 17 through 23.

FIGS. 3, 4, 5, 6 report applicative examples of the method of present invention for the cleaning of a Topping Unit, normally installed in a crude oil refinery; in such figures, dotted lines represent the lines used to establish a closed loop, which, when not available, can also be constructed specifically for the purposes of the method of present invention. During normal operation, feedstock comes from a storage tank and is pumped to plant battery limits 1 hence to feedline 30, then by means of a feedpump 2, is sent to heat exchangers 3, 4, 5, 6, 7 for preheating and then to a desalter 8, for reducing crude oil salt content. At the desalter exit, through line 29 and pump 9, feedstock is sent to heat exchangers 10, 11, 12, 13, 14 for further preheating and then, by means of line 31, to a furnace 15 and, by means of lines 32 and 33, to a distillation column 16. Bottom residue, by means of line 34, pump 17 and line 35 is sent to heat exchangers 18, 19, 20, 21 and then, by means of line 22, is sent to another plant and/or to storage.

During plant shutdown, before putting out of service the apparatuses to accomplish hydrocarbon removal, a water flushing is performed. In such a case, water is pumped in feedline 30 and exits the plant via line 22. Flushing operation consists in flowing water once-through for a time sufficient to move hydrocarbons from apparatuses, normally 2-3 hours. Normally no hydrocarbon-based (e.g. with gas oil) flushing is performed, but, if performed, it would have the purpose of replacing heavy hydrocarbons from apparatuses only, as already mentioned. After water flushing, water is drained from apparatuses, followed by their opening for mechanical cleaning. During shutdown operations no any kind of circulation is performed inside the plant, neither any hydrocarbon-based fluid(s) is added, as defined in present invention, to accomplish apparatuses cleaning. Apparatuses cleaning is normally performed by accomplishing the already mentioned operations, which lead to mechanical cleaning.

Figure 3:
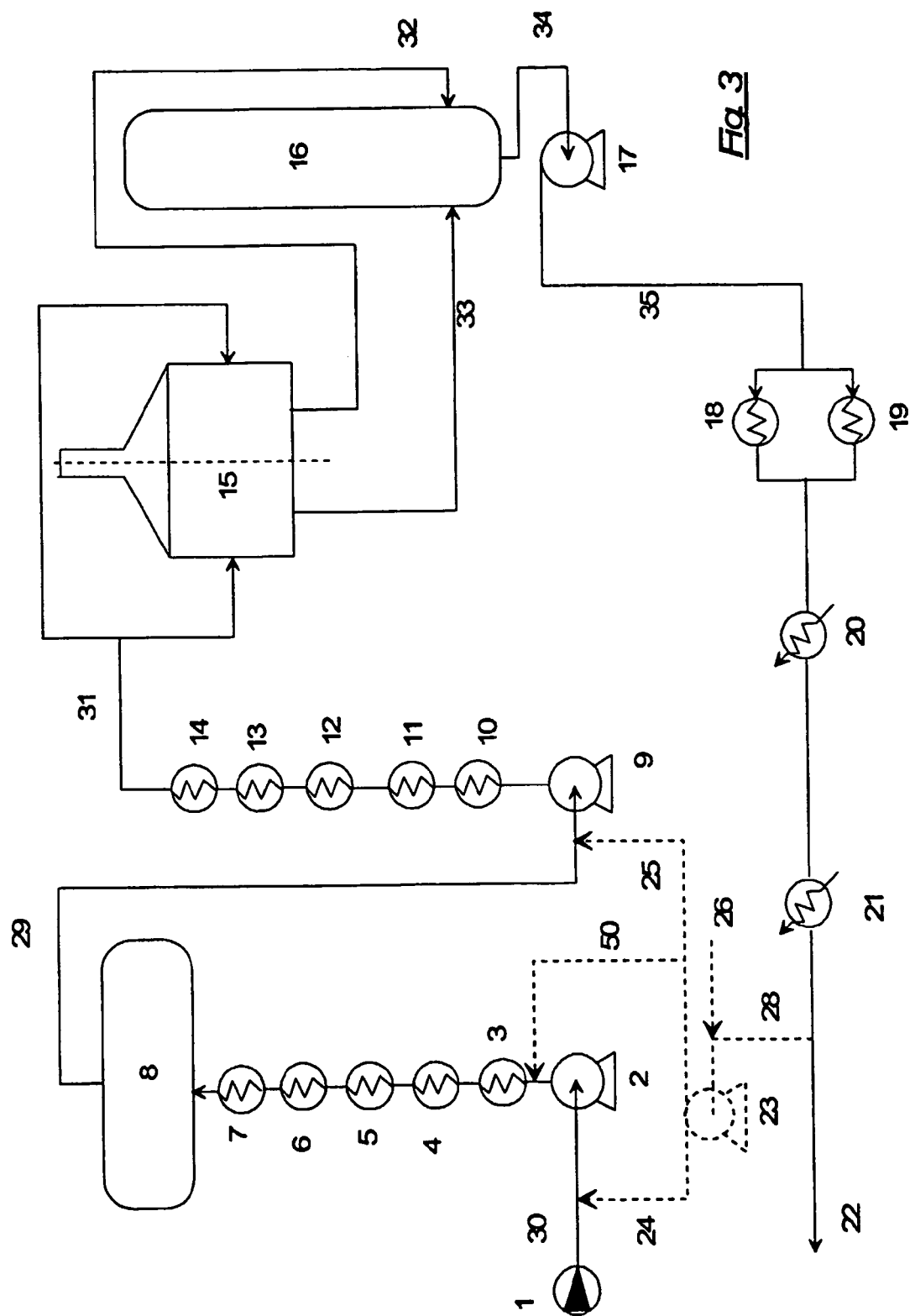
FIGS. 3, 4, 5, 6 report the applicative example of the cleaning of a Topping plant.

FIG. 3 reports an exemplary application of present invention, wherein circulation inside Topping plant is established by installing a line 28 in line 22 and an external pump 23 which can introduce hydrocarbon-based fluid(s) under present invention 26 in the following points: i) in feedline 30, by means of line 24; ii) at desalter's outlet line 29, by means of line 25; iii) in discharge line of feedpump 2, by means of line 50. With such a layout a closed loop is established, wherein heat is supplied by the heater 15, which is a part of the Topping plant. Circulation of hydrocarbon-based fluid(s) under present invention, at claimed operating conditions, will achieve the cleaning of the contacted apparatuses.

Figure 4:
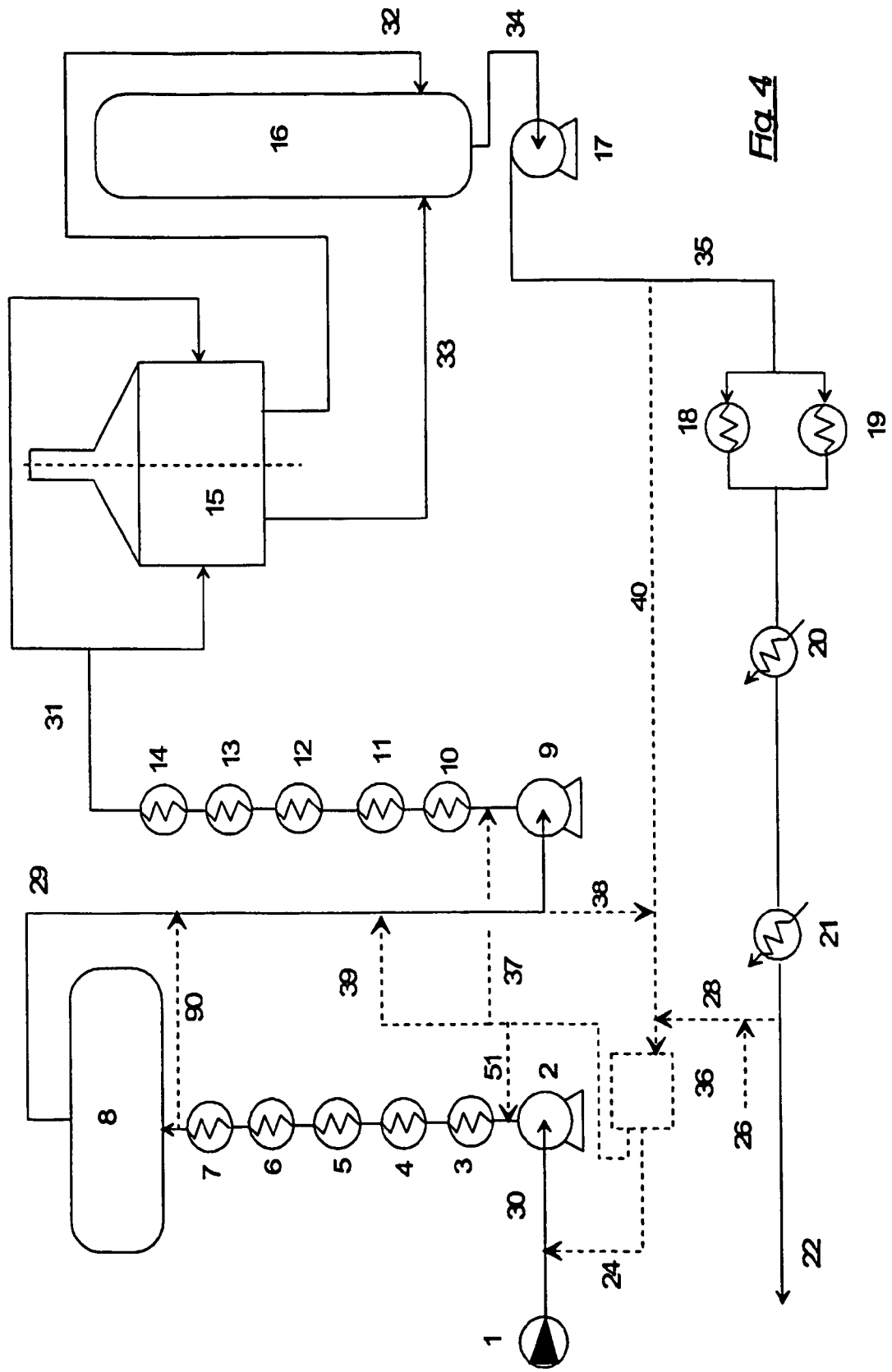

FIG. 4 reports another exemplary application of present invention, wherein circulation inside Topping plant is established by installing a line 28 in line 22 and a plant to accomplish the method of present invention 36, which can introduce hydrocarbon-based fluid(s) under present invention 26 in the following points: i) in feedline 30, by means of line 24; ii) at desalter's outlet line 29, by means of line 39; iii) in discharge line of pump 9, by means of line 37; iv) in discharge line of feedpump 2, by means of line 51. The plant 36 can be fed, e.g.: i) from residuum outlet line 22, by means of line 28; ii) from desalter's outlet line 29, by means of line 38; iii) from bottom line 35, by means of line 40. With such a layout a closed loop is established, wherein heat is supplied by the plant 36 and/or by the heater 15, which is a part of the Topping plant. Circulation of hydrocarbon-based fluid(s) under present invention, at claimed operating conditions, will achieve the cleaning of the contacted apparatuses.

Figure 5:
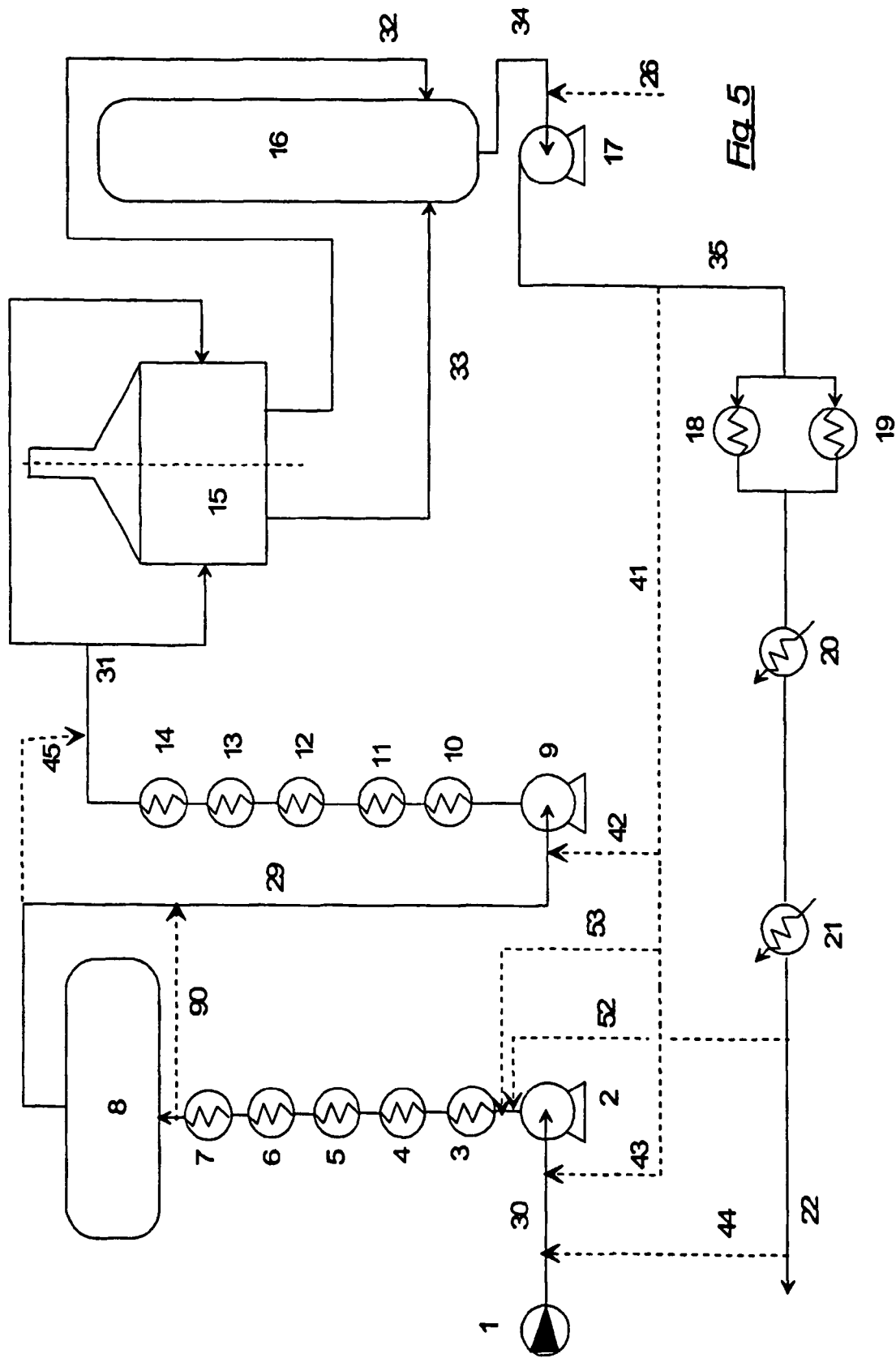

FIG. 5 reports still another exemplary application of present invention, wherein circulation inside Topping plant is established by installing: i) a line 44 in line 22, which closes the loop with feedline 30; ii) a line 52 in line 22, which closes the loop with feedpump 2 discharge; iii) a line 41 in line 35, which can close the loop on: a) feedline 30, by means of line 43, b) desalter's outlet, by means of line 42, c) feedpump discharge 2, by means of line 53. Moreover, a by-pass line 45 can exclude exchangers 10, 11, 12, 13, 14. A by-pass line 90 can exclude the desalter 8 from circulation loop; in this case desalter 8 can be cleaned separately, e.g. by connecting it to the plant 36, under the method of present invention. Hydrocarbon-based fluid(s) under present invention 26 can be introduced, e.g., on suction of pump 17 or of feedpump 2. With such a layout a closed loop is established, wherein heat is supplied by the heater 15, which is a part of the Topping plant. Circulation of hydrocarbon-based fluid(s) under present invention, at claimed operating conditions, will achieve the cleaning of the contacted apparatuses.

In the examples reported hereinabove, lines 28, 24, 25, 37, 38, 39, 40, 41, 42, 43, 44, 45, 50, 51, 52, 53 are not a part of Topping plant and are installed specifically, under present invention, for closing the circulation loop.

Figure 6:
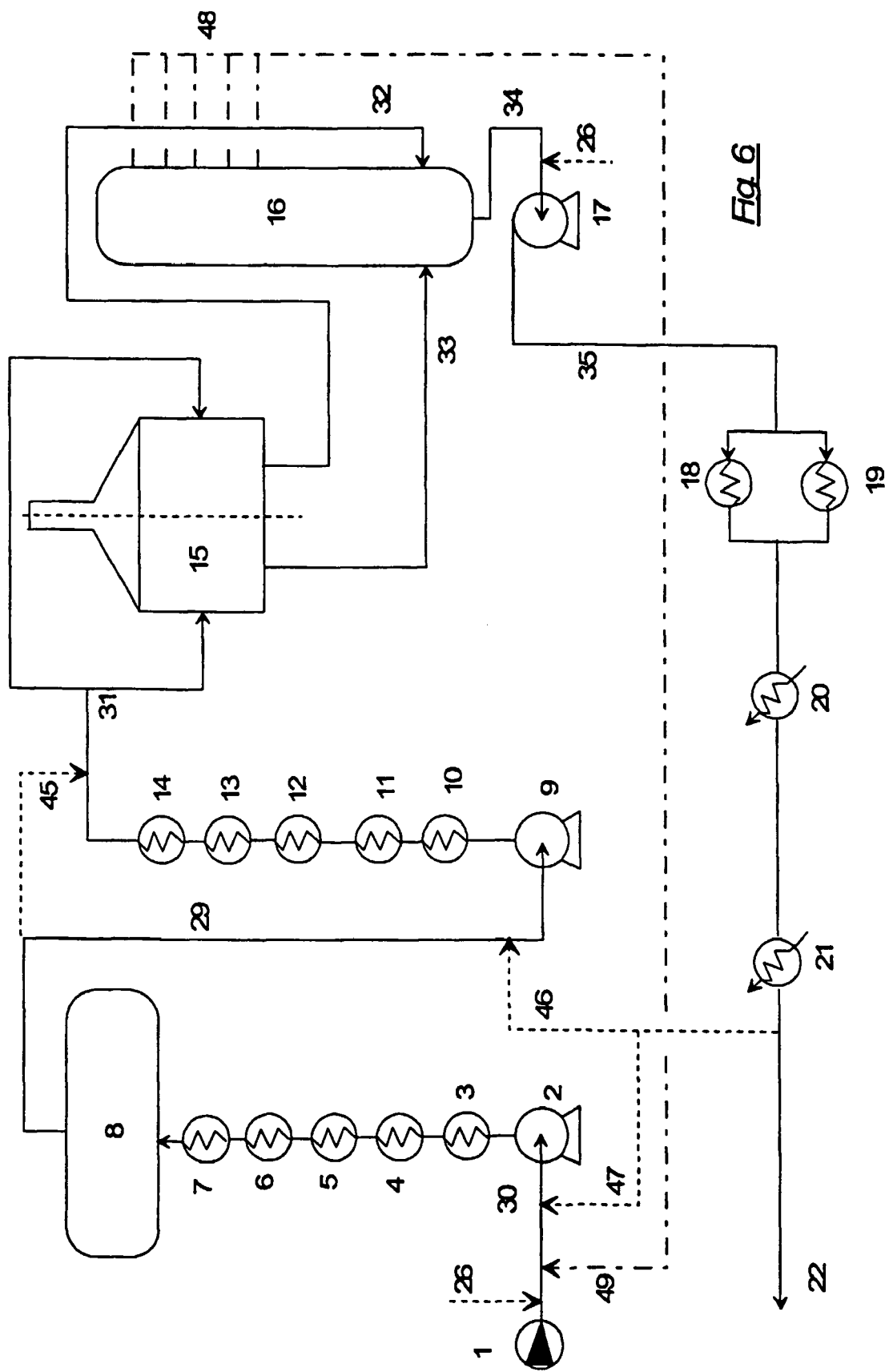

FIG. 6 reports another exemplary application of present invention, wherein circulation inside Topping plant is established by utilizing Topping plant lines, which are normally utilized for other purposes. For example, line 46 is utilized for assuring minimum design flowrate at heater 15 in times wherein feedstock rate is low. As a matter of fact, if fresh feedstock 1 is insufficient, bottom residue is circulated through line 46, which connects it to pump 9. Always for assuring minimum design flowrate at heater 15, a circulation is established by means of line 47 which sends bottom residue on suction line 30 of feedpump 2. Line 47 is also used during plant start-up for establishing feedstock circulation until normal plant operating conditions are reached and distillation products which exit column 16 are on specification. In this case bottom residue is cooled down to satisfy feedpump inlet temperature specifications (normally not higher than 60-90 C). Always during plant start-up, lines 48 and 49 allow the circulation of distillation products until normal plant operating conditions are reached; as a matter of fact, until normal plant operating conditions are reached, distillation products are out of specification and cannot be sent to storage. Normally, only LPG is stored; sometimes also gasoline is stored during start-up. Therefore, the plant is equipped with a pipe arrangement 48, which join together all start-up out of specification distillation products and send them in feedline 30 by means of line 49.

Lines 46, 47 are therefore used for purposes different of those of present invention. Moreover: a) they circulate crude distillation residue, not hydrocarbon-based fluid(s) under present invention; b) they are used only during plant start-up of the Topping Unit.

Lines 48, 49 are also used for purposes different of those of present invention. Moreover: a) they circulate crude distillation products, not hydrocarbon-based fluid(s) under present invention; b) they are used only during plant start-up of the Topping Unit.

Under present invention, lines 46, 47 are used to circulate a hydrocarbon-based fluid(s) under present invention, under the method of present invention; moreover, they are used during or after shutdown of the Topping Unit. Under present invention, also lines 48, 49 are used to circulate a hydrocarbon-based fluid(s) under present invention, under the method of present invention; moreover, they are used during or after shutdown of Topping Unit.

Alternatively, always under present invention, products distilled during circulation at present invention's operating conditions can be condensed and totally refluxed inside distillation column (total reflux conditions).

In all exemplary applications reported hereinabove, introduction of hydrocarbon-based fluid(s) under present invention can be performed in any point of the circulation loop.

It is also evident, any combination of exemplary applications reported hereinabove is under the scope of present invention, in that it is important to establish a circulation loop inside the plant wherein the cleaning is to be performed, rather than the single points wherein the loop is created, provided the loop effectively includes all the apparatuses to be cleaned and heating means, which can be internal and/or external to the chemical or hydrocarbon processing plant which contains the apparatuses to be cleaned.

As a further exemplary industrial application of the method under present invention, the method for cleaning the crude oil preheaters, the desalters and the main column bottom of a Topping Unit comprises the following steps:

1. installing or inserting lines in order to establish a closed flow circulation loop, which effectively encloses the apparatuses to be cleaned and heating means preferably selected from the following group: i) the Topping furnace, ii) an organic heat transfer fluid circuit, iii) a plant under present method;
2. filling said closed loop with a first hydrocarbon-based fluid under present method, preferably selected from the group of: crude oil, gasoline, kerosene, gas oil, Light Cycle Oil, benzene, toluene, xilene, and the like;
3. closing the circulation loop;
4. optionally introducing in any suitable point of the closed loop a second hydrocarbon-based fluid(s) under present method;
5. starting circulation by means of feedstock pumps and/or pumps at desalters' exit and/or bottom pumps and/or a plant under present method;
6. heating up the circulating fluid at a temperature preferably comprised between 100° C. and 400° C., most preferably between 150° C. and 350° C., still most preferably between 150° C. and 250° C.;
7. setting the pressure of the circulating fluid, at pump discharge, to a value comprised preferably between 1 bar and 50 bar, most preferably between 10 bar and 50 bar, still most preferably between 25 bar and 50 bar;
8. circulating the fluid for a time sufficient to clean the apparatus(es), preferably comprised between 20 minutes and 7 days, at temperature comprised between 100° C. and 600° C. and a pressure comprised between 1 bar and 50 bar;

9. circulating inside the plant, wherein eventual distillation products are condensed and sent back to circulation loop, e.g. in feedpump suction or at main column's bottom;
10. monitoring the status of cleaning operations, as to determine cleaning time, by performing chemical/physical analysis;
11. optionally reducing temperature and pressure of the circulating fluid in order to allow subsequent fluid discharge;
12. removing the circulating fluid, by pumping it out of the circulation loop;
13. optionally recovering and reutilizing the fluid;
14. optionally repeating the steps 2 through 13;
15. optionally degassing the apparatus(es) that has been cleaned, under the present method.

Cleaning under present invention will be terminated when evaluation of chemical/physical analysis under present method, as defined hereinafter, gives suitable indications. At this point heat exchangers, pumps, lines, column's bottom and all the surfaces that have been contacted with the circulating fluid will be free from heavy hydrocarbons deposits. If Topping has to start-up it will be not necessary to disassemble or open the apparatus(es) for cleaning. If opening of the apparatus(es) is dictated by maintenance or inspection jobs, it can be convenient to add the following steps for degassing the plant:

16. filling with water the closed flow circulation loop;
17. adding a water-soluble fluid under present method;
18. heating up the circulating fluid at a temperature preferably comprised between 60° C. and 150° C., most preferably between 80° C. and 130° C., still most preferably between 90° C. and 120° C.;
19. setting the pressure of the circulating water solution to a value comprised preferably between 1 bar and 50 bar, most preferably between 1 bar and 25 bar, still most preferably between 1 bar and 10 bar;
20. circulating the fluid by means of feedstock pumps and/or pumps at desalters' exit and/or bottom pumps and/or a plant under present invention for a time sufficient to clean the apparatus(es), preferably comprised between 20 minutes and 3 days, at temperature comprised between 60° C. and 150° C. and a pressure comprised between 1 bar and 10 bar;
21. monitoring the status of cleaning operations, as to determine cleaning time, by evaluating total hydrocarbon content in the circulating solution;
22. optionally reducing temperature and pressure of the circulating fluid in order to allow subsequent fluid discharge;
23. removing the circulating fluid;
24. optionally recovering and reutilizing the fluid;
25. optionally repeating the steps 16 through 24;
26. optionally repeating of steps 16 and 18 through 23.

In the cases described hereinabove, cleaning of multiple and different apparatuses is performed simultaneously.

What described hereinabove for Topping and Visbreaker can also be applied for any chemical or hydrocarbon processing plant, as defined in present invention.

Figure 7:
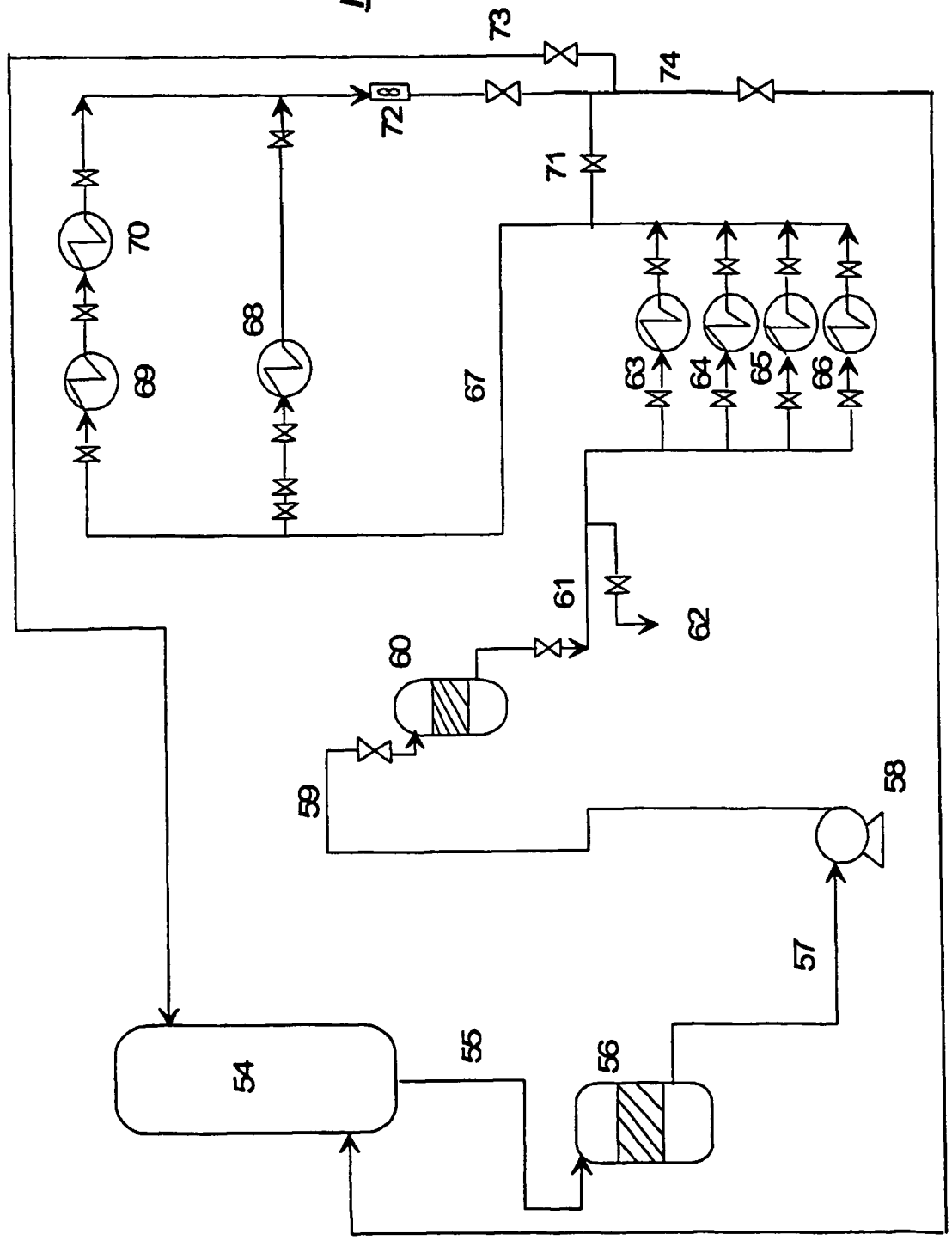
FIG. 7 reports the applicative example of the cleaning of a quench oil circuit of an Ethylene plant.

FIG. 7 is an exemplary application for cleaning quench oil circuit of Ethylene plants. During normal operation, bottom product 54 is sent, by means of line 55, filter 56, line 57, pump 58, line 59, filter 60 and line 61, to bottom heat exchangers 63, 64, 65, 66, 68, 69, 70, 72. In such a way bottom product is cooled up and sent again in column 54 by means of lines 73 and 74. During normal operation of Ethylene plant, bottom heat exchangers 63, 64, 65, 66, 68, 69, 70, 72 do foul due to heavy compounds contained in bottom product; to clean them, they are disassembled and mechanically cleaned by hydroblasting.

As a still further exemplary application of the method of present invention, the method for cleaning quench oil circuit of Ethylene plants comprises the following steps:
1. establishing a closed circulation loop by connecting any point in the column return line, preferably downstream bottom heat exchangers, with any point at columns' bottom, preferably upstream bottom pump, or eventually downstream bottom pump, in order to effectively include in the closed loop: a) all the apparatuses to be cleaned, b) optionally a plant under present invention;
2. optionally removing hydrocarbons from the closed loop;
3. filling the closed loop with a first hydrocarbon-based fluid under present method, preferably selected from the following group: gasoline, kerosene, gas oil, Light Cycle Oil, benzene, toluene, xilene and the like;
4. optionally introducing in any suitable point of the closed loop a second hydrocarbon-based fluid(s) under present method;
5. starting circulating the fluid;
6. optionally connecting quench oil exchangers, in the side which has not to be cleaned, with steam of suitable temperature and pressure, in order to achieve a suitable temperature of the circulating fluid;
7. heating up the circulating fluid at a temperature preferably comprised between 100° C. and 600° C., most preferably between 150° C. and 400° C., still most preferably between 150° C. and 250° C.;
8. setting the pressure of the circulating fluid to a value comprised preferably between 1 bar and 50 bar, most preferably between 10 bar and 50 bar, still most preferably between 25 bar and 50 bar;
9. circulating the fluid by means of bottom pumps and/or a plant under present method for a time sufficient to clean the apparatus(es), comprised preferably between 20 minutes and 7 days, at temperature comprised between 100° C. and 600° C. and a pressure comprised between 1 bar and 50 bar;
10. circulating inside the plant, wherein eventual distillation products are condensed and sent back to circulation loop, e.g. in the bottom pump suction;
11. optionally setting temperature and pressure inside bottom exchangers or the circulation loop as to reach near critical or, preferably, supercritical conditions of hydrocarbon-based fluid(s) under present invention;
12. monitoring the status of cleaning operations, as to determine cleaning time, by performing chemical/physical analysis;
13. optionally reducing temperature and pressure of the circulating fluid in order to allow subsequent fluid discharge;
14. removing the circulating fluid, by pumping it out of the circulation loop or by draining or by displacement with a suitable fluid;
15. optionally recovering and reutilizing the fluid, e.g., by: a) pumping it in a pyrolysis oil tank; b) pumping it in a slop oil tank; c) pumping it in a fuel oil tank; d) pumping it in the quench oil circuit; e) pumping it in another hydrocarbon processing plant;
16. optionally repeating the steps 3 through 15;
17. optionally degassing the apparatus(es) that has been cleaned, under the method of present invention.

Cleaning under present invention will be terminated when monitoring under present method, as defined hereinafter, will give suitable indications. At this point heat exchangers, pumps, lines and all the surfaces that have been contacted with the circulating fluid will be free from heavy hydrocarbons deposits. If Ethylene plant has to start-up it will be no necessary to disassemble or open the apparatus(es) for cleaning. If opening of the apparatus(es) is dictated by maintenance or inspection jobs, it can be convenient to add the following steps for degassing the plant:
18. filling with water the closed flow circulation loop;
19. introducing a water-soluble fluid under present method;
20. heating up the circulating fluid at a temperature preferably comprised between 60° C. and 150° C., most preferably between 80° C. and 130° C., still most preferably between 90° C. and 120° C.;
21. setting the pressure of the circulating water solution to a value comprised preferably between 1 bar and 50 bar, most preferably between 1 bar and 25 bar, still most preferably between 1 bar and 10 bar;
22. circulating the fluid by means of bottom pumps and/or a plant under present invention, for a time sufficient to clean the apparatus(es), comprised preferably between 20 minutes and 7 days, at temperature comprised between 60° C. and 150° C. and a pressure comprised between 1 bar and 50 bar;
23. monitoring the status of cleaning operations, as to determine cleaning time, by evaluating total hydrocarbon content in the circulating solution;
24. optionally reducing temperature and pressure of the circulating fluid in order to allow subsequent fluid discharge;
25. removing the circulating fluid;
26. optionally recovering and reutilizing the fluid;
27. optionally repeating the steps 18 through 26;
28. optionally repeating of steps 18 and 20 through 26.

In the case described hereinabove, multiple apparatuses cleaning can be performed simultaneuosly. In cases wherein a column's bottom is a part of the closed flow circulation loop, this will be filled up only for the amount needed to assure sufficient suction head of the bottom pump. This amount normally ranges between 5-25% of the column volume.

As evident to those skilled in the art, the methods illustrated in the exemplary applications for cleaning Visbreaker bottom circuit, Topping Unit and Ethylene quench oil circuit can be easily applied to any chemical and/or hydrocarbon processing plant, for achieving the same purposes under the scope of present invention.

As also evident to those skilled in the art, the heating means can be the stream which flows in the side of the apparatus(es) which has not to be cleaned.

Figure 9:
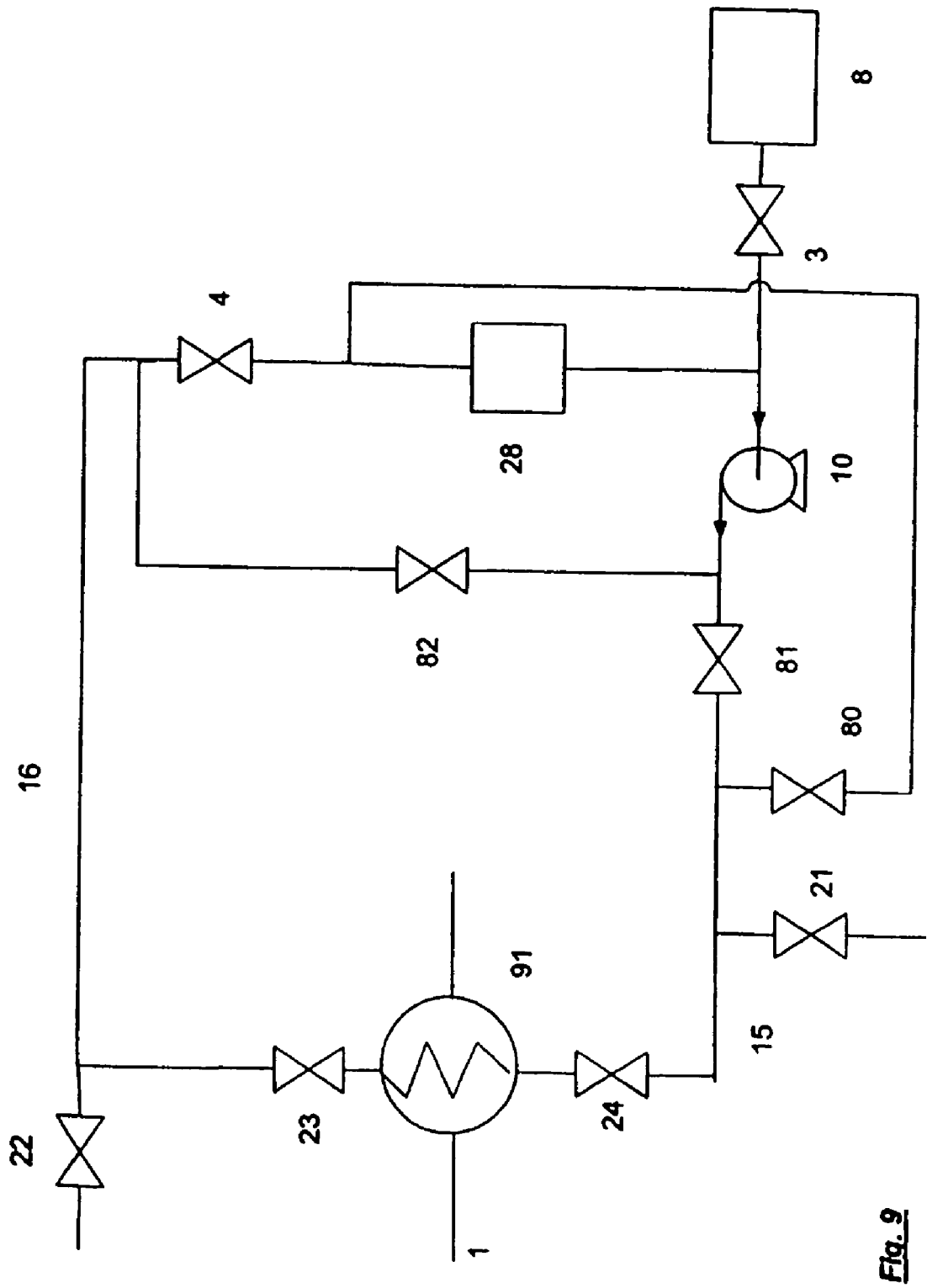

FIG. 9 reports the exemplary application of the cleaning of a heatexchanger 1, wherein, e. g., the tube side has to be cleaned and on the shell side flows a stream 91 having a temperature >100 C. In this case the heat exchanger 1 is connected on the shell side with the process to which it is a part, characterized from having a stream 91 with a temperature>100 C, and on the tube side with a pump 10 by establishing a closed loop; hydrocarbon-based fluid(s) under present invention, contained in a vessel 8, is introduced in any point of the closed loop. Alternatively, steam of suitable temperature and pressure can be introduced as heating medium in the side which has not to be cleaned. Circulation pump 10 performs circulation of hydrocarbon-based fluid(s) and can supply pressure to the system. Circulation loop is established by connecting discharge line 15 and suction line 16 to the heat exchanger 1 at any suitable points, e.g. drain valves 23 and 24. Hydrocarbon-based fluid(s) under present invention is introduced by opening valve 3. Valve 21 is an auxiliary exit, while valve 22 is an auxiliary inlet. Filter 28 assures solids to be removed from circulating solution. Flow is reverted by means of valves 80, 81, 82, 4.

For filling the closed loop containing the apparatus(es) to be cleaned, a first hydrocarbon-based fluid(s) under present invention is introduced in said closed loop; it can be utilized alone or in mixture with other hydrocarbon-based fluid(s).

This type of hydrocarbon-based fluid(s) can be derived from crude oil, coming from any chemical or hydrocarbon processing plant and/or in any way present in any chemical or hydrocarbon processing plant, and are preferably selected from the following group: crude oil, gasoline, gas oil, virgin naphtha, kerosene, light cycle oil from FCC, decant oil from FCC, methyl-tert-butyl-ether (MTBE), benzene, toluene, xylenes, cumene, methanol, cyclohexane, ethylbenzene, linear alkylbenzene, dimethylterephtalate, phtalic anhydride, styrene, tert-amyl-methyl -ether (TAME), ethanol, dimethylformamide (DMF) dioctylphtalate, isopropyl alcohol, butyl alcohol, allyl alcohol, butylglycol, methylglycol, ethyl-tert-butyl-ether (ETBE),ethanolamines, acetone, octyl alcohol, methyl-ethyl-ketone, methyl-isobutyl-ketone.

Generally, fluids under present invention can be chosen among those arising from chemical or hydrocarbon processing plants or in any way present in chemical or hydrocarbon processing sites as finished products, blending components, intermediates or plant feedstock. In some cases, crude oil itself, fuel oil, quench oil from Ethylene plants, or in general the process fluid which is part of a chemical or a hydrocarbon processing plant, can act as a fluid under present invention.

A particular fluid under present invention is MTBE present in an oil refinery or produced in a petrochemical plant. MTBE is utilized in an oil refinery exclusively as blending component in lead-free gasoline formulation, in order in boost octane number of formulated gasoline; its presence in an oil refinery is exclusively due to this purpose. MTBE can also be utilized as fluid for different applications but not for cleaning apparatuses. Utilization of MTBE under present invention differs from the state of the art and has to be considered an innovative step.

Under present invention MTBE can be pumped and circulated inside any hydrocarbon processing plant, alone or admixed with hydrocarbon-based fluid(s) under present invention, for the purpose of cleaning apparatuses. In case of an oil refinery, under present invention, MTBE utilized for cleaning will be fully recovered e.g. by pumping the cleaning fluid to a crude oil tank or directly inside the plant which contains the apparatus(es) to be cleaned. By reprocessing cleaning fluid, MTBE will distill in the gasoline fraction and then pumped to a gasoline tank, where it will exert its function of octane booster.

The same arguments for MTBE may also apply to aromatic gasoline arising from a Reforming plant or to benzene/toluene/xylene (BTX) mixture from a Aromatic Extraction plant.

For improving solubilization and stabilization of deposits inside the apparatuses, a second hydrocarbon-based fluid(s) is introduced in the closed loop. If the closed loop is totally full with the first hydrocarbon-based fluid(s), the second one will displace the first by temporarily opening the closed loop, for a time sufficient for such displacement to occur.

This second hydrocarbon-based fluid(s) is able to solubilize deposits inside apparatus(es) to be cleaned. Preferably it is able to solubilize and/or stabilize asphaltenes. Most preferably, it is under near critical or supercritical conditions at the operating conditions of the plant under present invention.

Under present invention, second hydrocarbon-based fluid(s), utilized alone or in any mixture, are preferably selected from the following group: polymetacrylates, polyisobutylene succiniminides, polyisobutylene succinates; laurylacrylate/hydroxyethylmetacrylate copolymer; alkylarylsulfonates, alcanolamine-alkylarylsulfonates and alkylarylsulfonic acids; substituted amines, where the substituent is an hydrocarbon containing at least 8 carbon atoms; acylated compounds containing nitrogen and having a substituent with at least 10 aliphatic carbon atoms, such substituent being obtained by reaction of an acylant carboxylic acid with at least an aminic compound containing at least a group —NH—, said acylant agent being joined to said aminic compound by way of a imido, amido, amidine or acyloxyammonium bridge; nitrogen containing condensated compounds of a phenol, an aldehyde or an aminic a compound, having at least a group —NH—; esters of a substituted carboxylic acid; hydrocarbyl substituted phenols; alcoxylated derivatives of an alcohol, a phenol or an amine; phtalates; organic phosphates; oleic acids esters; polyamines. To our knowledge, those fluids have not been used in connection of cleaning of apparatuses.

For the purposes of present method all glycols and/or their derivatives can also be utilized as second hydrocarbon-based fluid(s), such glycols and/or their derivatives being not in a polymeric form, in the sense that they are molecules of single compounds, also in an adduct form, and not molecules constituted by a chain where a single monomer is repeated; under present invention are to be considered as single glycols the following compounds: tetraethyleneglycol; mono- and di-ethers, mono- and di-esters, ether-esters and thioethers of single glycols.

For the purposes of present method glycols are selected from the group of: glycol of general formula $CH_2OH—(CH)_nOH_n—CH_2OH$ where n=0-10; glycol ethers of general formula $R_1—O—CH_2—CH_2—O—R_2$ where $R_1$ is an hydrocarbyl substituent $C_1$-$C_{20}$ and $R_2$ is H atom or an hydrocarbyl substituent $C_1$-$C_{20}$; glycol esters of general formula $R_1—O—O—CH_2—CH_2—O—O—R_2$ where $R_1$ is an hydrocarbyl substituent $C_1$-$C_{20}$ and $R_2$ is H atom or an hydrocarbyl substituent $C_1$-$C_{20}$; glycol ethers-esters of general formula $R_1—O—CH_2—CH_2—O—O—R_2$ where $R_1$ and $R_2$ are an hydrocarbyl substituent $C_1$-$C_{20}$. Under present invention second hydrocarbon-based fluids can also be selected from the group of: ethers of general formula $R_1—O—R_2$ where $R_1$ or $R_2$ is an hydrocarbyl substituent $C_1$-$C_{20}$; substituted benzenes of general formula

where n=1-6 and R can be indifferently H atom, —OH group, —CHO group, —NH$_2$ group, the same or different hydrocarbyl substituent $C_1$-$C_{30}$; ketons of general formula $R_1—CO—R_2$ where $R_1$ or $R_2$ is an hydrocarbyl substituent $C_1$-$C_{20}$; anhydrides of general formula $R_1—CO—O—CO—R_2$, included those where $R_1$ and $R_2$ are bound together to form cyclic anhydrides, where $R_1$ or $R_2$ is an hydrocarbyl substituent $C_1$-$C_{20}$; amides of general formula

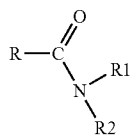

where R, $R_1$, $R_2$ are indifferently H atom or an hydrocarbyl substituent $C_1$-$C_{20}$; hetherocyclic compounds, preferably the hydrogenated ones, containing from 0 to 3 hydrocarbyl substituent $C_1$-$C_{20}$.

For the purposes of present invention hetherocyclic compounds can be of different types, in that they contain atoms with free electronics pairs that contribute to both heavy compounds solubilization and to asphaltenes dispersion.

Heterocyclic compounds according present invention include preferably those selected from the following group: furans, pyrrols, imidazoles, triazoles, oxazoles, thiazoles, oxadiazoles, pyranes, pyridine, pyridazine, pyrimidine, pyrazine, pyperazine, piperidine, triazines, oxazines, oxadiazines, morpholine, indane, indenes, benzofuranes, benzothiophenes, indoles, indazole, indoxazine, benzoxazole, anthranile, benzopyrane, coumarines, quinolines, benzopyrones, cinnoline, quinazoline, naphthyridine, pyrido-pyridine, benzoxazines, carbazole, xanthene, acrydine, purine, benzopyrroles, cyclic amides, benzoquinolines, benzocarbazoles, indoline, benzotriazoles.

By describing the previous group the compounds named in plural are to be intended as encompassing all the possible compound structures, including the iso-form: e.g. the term "dithiols" include 1,2 dithiol and 1,3 dithiol, "quinolines" include quinoline and isoquinoline.

As used in present invention the term "hydrocarbyl" refers to a group having a carbon atom directly attached to the rest of the molecule and having a hydrocarbon or predominantly hydrocarbon character. Among these, there may be mentioned hydrocarbon groups, including aliphatic, (e.g. alkyl or alkenyl), alicyclic (e.g. cycloalkyl or cycloalkenyl), aromatic, aliphatic- and alicyclic-substituted aromatic, and aromatic-substituted aliphatic and alicyclic groups. Aliphatic groups are advantageously saturated. Examples include methyl, ethyl, propyl, butyl, isobutyl, pentyl, hexyl, octyl, decyl, octadecyl, cyclohexyl, and phenyl. These groups may, as indicated above, contain non-hydrocarbon sustituents provided they do not alter the predominantly hydrocarbon character of the group. Examples include keto, hydroxy, alkoxy, acyl and amino. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable heteroatoms include, for example, nitrogen, oxygen and sulfur.

Among the hereinabove fluids are to be preferred those selected preferably from the following group: methanol, ethanol, propanol, isopropanol, butanol, isobutanol, methylglycol monomethylether, butylglycol monobutylether, toluene, aliphatic amines $C_8$+ethoxylated with at least 6 moles ethylene oxide, aryl sulfonates, benzene, diphenyl, phenanthrene, nonylphenol, 1-methyl-2-pyrrolidinone, diethyl ether, dimethylformamide (DMF), tetrahydrofuran (THF), ethylenediamine, diethylamine, triethylamine, propylamine, 1-(3-aminopropyl)-2-pyrrolidone, 1-(3-aminopropyl) imidazole, 2-(2-aminoethylamino)ethanol, isopropylamine, cumene, 1,3,5 trimethylbenzene, 1,2,4 trimethylbenzene, maleic anhydride, p-toluidine, o-toluidine, dipropylamine, diphenyl ether, hexamethylbenzene, propylbenzene, cyclohexylamine, 1-isopropyl-4-methyl-benzene, 1,2,3,5 tetramethylbenzene, hexanol, morpholine, o-xylene, m-xylene, p-xylene, butylamine, methylamine, mesitylene, hexamine, succinic anhydride, decahydronaphthalene, ethylbenzene, 1,2 dimethylnaphthalene, 1,6 dimethylnaphthalene, p-cymene, ethyl ether, isopropyl ether, etoxybenzene, phenyl ether, acetophenone, monoethanolamine (MEA), diethanolamine (DEA), triethanolamine (TEA), diethyleneglycol, triethyleneglycol, tetraethyleneglycol, dodecylbenzene, lauryl alcohol, myristyl alcohol, dibutylphthalate, dioctylphthalate, diisooctylphthalate, dinonylphthalate, didecylphthalate, methylethylketone (MEK), methylisobutylketone (K), methyl-tert-butyl-ether (MTBE), cyclohexane, methyl- or ethyl-esters of fatty acids achieved by esterification of vegetal and/or animal oils (biodiesel).

In still another preferred embodiment of present invention hydrocarbon-based fluids hereinabove defined are used under near critical or supercritical conditions. It is know, supercritical fluids are able to solubilize coke. However, their use has not been proposed for cleaning of apparatuses of a chemical or hydrocarbon processing plant, as it has not been proposed a mobile plant for this purpose, wherein cleaning of the apparatuses is performed by circulation of hydrocarbon-based fluid(s) under supercritical conditions in a closed loop inside the apparatuses.

Present invention is therefore to be considered as an improvement of state of the art.

A list of fluids which can be in supercritical conditions under present invention can be found in Handbook of Chemistry and Physics 74$^{th}$ Edition—CRC Press—page 6-54 through page 6-65. Among these are to be preferred those selected from the following group: dimethylamine, ethylamine, ethyl formate, methyl acetate, dimethylformamide, propanol, propylamine, isopropylamine, trimethylamine, tetrahydrofuran, ethyl vinil ether, ethyl acetate, propyl formate, butanol, methyl propanol, diethyl ether, methyl propyl ether, isopropyl methyl ether, diethyl sulfide, butylamine, isobutylamine, diethylamine, cyclopentanol, 2-methyltetrahydrofuran, tetrahydropyran, pentanal, isobutyl formate, propyl acetate, butyl methyl ether, tert-butyl methyl ether, ethyl propyl ether, methylpyridines, cyclohexanone, cyclohexane, methylcyclopentane, cyclohexanol, hexanal, pentyl formate, isobutyl acetate, 2-ethoxyethyl acetate, methyl pentyl ether, dipropyl ether, diisopropyl ether, hexanol, methyl pentanols, triethylamine, dipropylamine, diisopropylamine, benzaldehyde, toluene, cresols, benzyl alcohol, methylanilines, dimethylpyridines, furfural, pyridine, methylcyclohexane, heptanol, acetophenone, ethylbenzene, xylenes, ethylphenols, xylenols, anilines, dimethylaniline, ethylaniline, octanenitrile, ethyl propanoate, methyl butanoate, methyl isobutanoate, propyl propanoate, ethyl 2-methyl propanoate, methyl pentanoate, propyl 3-methylbutanoate, octanoles, 4-methyl-3-heptanol, 5-methyl-3-heptanol, 2-ethyl-1-hexanol, dibutyl ether, di-tert-butyl ether, dibutylamine, diisobutylamine, quinoline, isoquinoline, indan, cumene, propylbenzene, 1,2,3-trimethylbenzene, 1,2,4,-trimethylbenzene, mesitylene, o-toluidine, N,N-dimethyl-o-toluidine, nonanols, naphthalene, butylbenzene, isobutylbenzene, cymenes, p-diethylbenzene, 1,2,4,5-tetramethylbenzene, decahydronaphthalene, decanol, 1-methylnaphthalene, carbazole, diphenyl, hexamethylbenzene, dodecanols, diphenyl methane, tridecanols, tetradecanols, hexadecanols, heptadecanols, terphenyls, octadecanols, eicosanols.

The compounds named with a plural refer to all possible isomer of the compound: e.g. the term "xylenes" refers to o-xylene, m-xylene and p-xylene.

Of particular interest are those compounds having a critical pressure (Pc)<5 MPa, preferably those with a Pc<3.5 MPa.

A list of fluids, useful under present invention, with their relative critical constants is reported hereinafter:

| Compound | Critical temperature (° C.) | Critical pressure (bar) |
|---|---|---|
| p-Toluidine | 394 | 23 |
| Ethyl butyrate | 293 | 30 |
| Dipropylamine | 277 | 31 |

-continued

| Compound | Critical temperature (° C.) | Critical pressure (bar) |
|---|---|---|
| Isobutyl acetate | 288 | 31 |
| Propyl acetate | 276.2 | 32.9 |
| Propyl-ethyl-ether | 227.4 | 32.1 |
| Triethylamine | 262 | 30 |
| Ethylbenzene | 344 | 38 |
| Propylbenzene | 365.2 | 32.3 |
| Butylbenzene | 387.2 | 30.4 |
| Cumene | 357.9 | 32.3 |
| para-xylene | 342.8 | 36.1 |
| Hexamethylbenzene | 494 | 23.5 |
| Triethanolamine | 514.3 | 24.2 |
| Diphenyl methane | 497 | 28.6 |
| Diphenyl | 516 | 38.5 |
| MTBE | 224 | 34.3 |
| Dioctylphtalate | 532.8 | 11.8 |
| Diisodecylphtalate | 613.8 | 10 |
| Diisooctylphatalate | 577.8 | 11.8 |
| Nonylether | 462.8 | 13 |
| Methyloleate | 490.8 | 12.8 |
| Dioctylether | 433.8 | 14.4 |

The performance of fluids useful under present invention can be enhanced by including in their formulation suitable amounts of swelling agents, which contribute in modifying coke morphology. Swelling agents are well known in coal solubilization/extraction techniques, but have not been utilized for such purposes in petroleum/petrolchemical industry. In their known applications, swelling agents penetrate coal and provoke its swelling. Factors influencing the amount of swelled coal in a fluid are: a) fluid-coal interaction degree; b) cross-link density. Swelling ratio is the ratio between the volume of swelled coal, in equilibrium with the fluid, in respect to the volume of original coal.

In general, fluids utilized for such purposes possess good characteristics of coal solubilization. By using swelling agents, decoking of apparatuses, e.g. process heaters, will be eased due to change in morphology of formed coke (from "needle-like" to "fluffy" or "cloud-like").

Fluids used as swelling agents are classified in two classes: forming hydrogen bonds and non forming hydrogen bonds. In general, the first are reported to be 25-30% as effective as the latter; effectiveness of the latter can be increased following a first coal extraction with a fluid forming hydrogen bonds with coal.

Swelling effectiveness, and hence coal penetration, is attributed to substitution of carbon-carbon hydrogen bonding with fluid-carbon hydrogen bonding: the same principle is used, among the others, in present invention.

Among non forming hydrogen bonds swelling agents are to be preferred those selected from the following group: benzene, toluene, cyclohexane, naphthalene, diphenyl, xylene, tetraline, methylcyclohexane. Among forming hydrogen bonds swelling agents are to be preferred those selected from the following group: pyridine, methanol, ethanol, ethylenediamine, propanol, 1,4-dioxane, acetone, formamide, aniline, tetrahydrofuran, N,N-dimethylaniline, diethylether, acetophenone, dimethylformamide, ethyl acetate, methyl acetate, methylethylketone, 1-methyl-2-pyrrolidone, quinoline.

In case circulation of hydrocarbon-based fluid(s) is performed at atmospheric pressure and temperature>150° C., under present invention are to be preferred the fluids having boiling temperature preferably>150° C., most preferably>250° C.

An exemplary list of such compounds can be found in the Handbook of Chemistry and Physics 74$^{th}$ Edition—CRC Press—, pages 3-12 through 3-523.

Without being bound to any specific ratio among the components, the ratio between first/second hydrocarbon-based fluid(s) under present invention can be any one suitable for the scope. As a matter of facts, in some cases utilizing only a first hydrocarbon-based fluid(s) under present invention allows cleaning of apparatus(es) under present invention.

During circulation, cleaning of the apparatus(es) can be monitored by performing on the circulating fluid some chemical analysis, as defined e.g. by methods published by American Society for Testing Materials (ASTM) (found in Annual Book of ASTM Standards for Petroleum Products) or by Institute of Petroleum of London (IP), preferably selected from the following group: viscosity (ASTM D 445); density (ASTM D1298); distillation (ASTM D86); Conradson Carbon Residue (CCR) (ASTM D4530 or D 189); sediments by hot filtration (IP 375); sediments for extraction (ASTM D473); ash content (ASTM D482); asphaltene content (IP143). Also physical systems can be utilized for this purpose, preferably selected from the following group: evaluation of heat transfer rate; evaluation of fouling factor, defined as the ratio of heat transfer rate of the clean apparatus and the heat transfer rate of the apparatus at the time it is evaluated; evaluation of pressure loss, defined as the pressure difference between two points of the apparatus; evaluation of temperature at apparatus(es) exit. As a matter of facts, as long as apparatus(es) is going to be cleaned, heavy compounds are solubilized in the cleaning fluid and hence circulating fluid becomes heavier: this is evidenced e.g. by an increase in viscosity and/or density and/or CCR and/or ashes; likewise, fouling factor and/or pressure loss will decrease, while heat transfer rate and/or temperature at apparatus(es) exit will increase.

For example, circulation can be continued until any significative decrease in fouling factor and/or pressure drop, or any significative increase in viscosity and/or density and/or CCR and/or ashes, will be revealed. Under present invention the term "significative" means, there is relative difference within 5% between two successive readings. Such chemical analysis and physical systems are routinely utilized for evaluating commercial specifications of petroleum products or during normal plant operation. To our knowledge, they've not been utilized in connection with cleaning operations during closed loop circulation.

Once the oil-based circulation under present invention has been terminated the apparatus(es) can be put immediately back on stream. Only in the case it is necessary to open the apparatus(es) for inspection or maintenance, it will be necessary to remove any hydrocarbons from apparatu(es)' surface in order to avoid fire or explosion. When the apparatus(es) is hydrocarbon-free it will be declared as gas-free.

In todays' techniques, gas-free is achieved mostly by purging apparatus(es) with steam (steam-out) for 1-7 days, wherein steam enters and exits the apparatus(es) in a once through manner. This procedure has many disadvantages in that: i) is time consuming; ii) it is energy consuming; iii) generates hydrocarbons emission. Sometimes also nitrogen is used for purging. Moreover, in todays' techniques gas-free is propaedeutic to mechanical cleaning to allow safe disassembling of the apparatus. It is mandatory to perform gas-freeing before disassembling any apparatus.

Under present invention gas-free can be achieved by circulation of a water solution of a water-soluble fluid(s). Under present invention gas-free is performed only after applying the cleaning method of present invention, and only in case the apparatus needs to be disassembled for inspection or maintenance. Gas-freeing operations can be monitored by evaluating total hydrocarbons content on the circulating water solution.

Water-soluble fluid(s) under present invention are preferably selected from the following group: non-ionic surfactants, anionic surfactants and their mixtures in any proportion.

Among anionic and non-ionic surfactants are preferred those selected from the following group: alkyl-, aryl-, or alkylaryl-benzensulphonates of general formula $RC_6H_4SO_3M$ wherein R is an hydrocarbyl substituent $C_8$-$C_{20}$ and M is ion H, Na, Ca, ammonium, triethanolammonium, isopropylammonium; dialkylsulfosuccinates of general formula $RO_2CCH_2CH(SO_3Na)CO_2R$ wherein R is an hydrocarbyl substituent $C_2$-$C_{20}$; alkylsulfates of general formula $ROSO_3M$ wherein R is an hydrocarbyl substituent $C_5$-$C_{20}$ and M is ion sodium, ammonium, triethanolammonium; ethoxylated and sulphated alcohols of general formula $R—(—OCH_2CH_2—)_n—OSO_3M$ wherein R is an hydrocarbyl substituent $C_5$-$C_{20}$, n=1-S and M is ion sodium, ammonium, triethanolammonium; ethoxylated alcohols of general formula $R—(—O—CH_2CH_2—)_n—OH$ wherein R is an hydrocarbyl substituent $C_5$-$C_{30}$, n=1-30; mono- and di-fatty acids glyceric esters wherein acid contains an hydrocarbyl substituent $C_{10}$-$C_{40}$; mono- and di-ethanolamides of fatty acids of general formula $RCONHC_2H_4OOCR$ and $RCON(C_2H_4OH)C_2H_4OOCR$ wherein R is an hydrocarbyl substituent $C_{10}$-$C_{40}$; surfactants of poly(oxyethylene-co-oxypropylene), also known as block polymer, having molecular weight of 50-10000; mono-, di- and poly-aliphatic amines derived fro fatty acids, such as $RNHCH_2CH_2CH_2NH_2$ wherein R is an hydrocarbyl substituent $C_{10}$-$C_{40}$; ethoxylated alkylamines of general formula

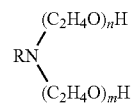

wherein m+n=2-40; alkoxylated ethylendiamines of general formula

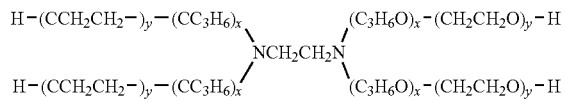

wherein x and y=4-100.

Peculiarities and results achievable under present invention are further illustrated by following examples.

EXAMPLE N. 1

100 g of a fouling deposit collected from fouled bottom heat exchanger of a Visbreaker plant have been placed in a laboratory autoclave, together with 100 g of a fluid with the following composition: 50% MTBE, 30% Xylene, 10% Ethomeen S 22 (aliphatic amine $C_{22}$ ethoxylated with 10 moles ethylene oxide), 5% Dimethylformamide, 5% Dioctylphtalate. Temperature has been increased up to 200° C. and pressure was set at 25 bar; such conditions have been maintained for 12 hours. After cooling and opening autoclave it was estimated, 99% of the original deposit was solubilized by the fluid.

EXAMPLE N. 2

100 g of a fouling deposit collected from fouled bottom heat exchanger of a Topping plant have been placed in a laboratory autoclave, together with 100 g of a fluid with the following composition: 40% Toluene, 20% Xylene, 20% Ethomeen S 22 (aliphatic amine $C_{22}$ ethoxylated with 10 moles ethylene oxide), 10% Dimethylformamide, 10% Butylglycol. Temperature has been increased up to 150° C. and pressure was set at 20 bar; such conditions have been maintained for 6 hours. After cooling and opening autoclave it was estimated, 100% of the original deposit was solubilized by the fluid.

Example N. 3

100 g of a fouling deposit collected from fouled fuel oil preheater of a Power Plant have been placed in a laboratory autoclave, together with 100 g of a fluid with the following composition: 50% Heavy aromatic naphtha, 20% Xylene, 10% Tetrahydrofuran, 10% Methylglycol, 10% Methyl alcohol. Temperature has been increased up to 200° C. and pressure was set at 25 bar; such conditions have been maintained for 6 hours. After cooling and opening autoclave it was estimated, 100% of the original deposit was solubilized by the fluid.

EXAMPLE N. 4

100 g of a fouling deposit collected from fouled heat exchanger from a quench oil circuit of an Ethylene plant have been placed in a laboratory autoclave, together with 100 g of a fluid with the following composition: 20% Toluene, 30% Xylene, 20% Butylglycol, 30% Methylglycol. Temperature has been increased up to 150° C. and pressure was set at 2 bar; such conditions have been maintained for 12 hours. After cooling and opening autoclave it was estimated, 100% of the original deposit was solubilized by the fluid.

EXAMPLE N. 5

100 g of a coke deposit collected from hydrocyclone after decoking operations of a heater of an Ethylene plant have been placed in a laboratory autoclave, together with 300 g of a fluid with the following composition: 20% Toluene, 40% MTBE, 30% Dioctylphatalate, 10% Isobutylacetate. Temperature has been increased up to 550° C. and pressure was set at 35 bar; such conditions have been maintained for 1 hour. After cooling and opening autoclave it was estimated, 90% of the original deposit was solubilized by the fluid.

As evident to those skilled in the art, the industrial applicability of present invention encompasses any apparatus of any chemical or hydrocarbon processing plant. The industrial application of present invention achieves the following improvements over the state of the art: a) elimination of the need of disassembling and re-inserting the apparatus; b) reduced time for cleaning; c) recovery and reutilization of fouling materials and of cleaning fluids; d) simultaneous cleaning of multiple apparatuses; e) elimination of damage to the apparatuses; f) safe and environmental friendly operations. Present invention also allows to clean chemical and/or hydrocarbon processing plant apparatuses with no significative penalties, if any, of feedstock reduction, hence achieving better economic results.

Without departing from the scopes of present invention, all the compositions specified can also contain amounts, sufficient to the scope, of active ingredients already known in the art. The addition of any dispersant, asphaltene stabilizer, detergent in the formulations under present invention cannot prejudice the novelty of the present invention.

In the above specification, all data obtained during lab tests and experiments have been included for completeness. Efforts to exclude any value outside acceptable error limits have not been made. It is believed that, during course of these tests and experiments, possible errors in preparing samples and in making measurements may have been made which may account for any occasional data that is not supportive of this art.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims are construed as encompassing all the features of patentable novelty which reside in the present invention, including all features which would be treated as equivalents thereof by those skilled in the art to which the invention pertains.

The invention claimed is:

1. A method for cleaning apparatus(es) of a chemical or hydrocarbon processing plant to remove heavy organic compounds, foulants, sludge or coke, as material to be removed, comprising:
   a) connection of the apparatus(es) to be cleaned to a plant comprised of:
      heating means,
      a system for circulating a fluid,
      a connection system for establishing a closed loop,
      inlet/outlet for fluids,
      control means,
      filtering means;
   b) establishment of a closed flow circulation loop which effectively includes:
      the apparatus(es) to be cleaned,
      the heating means,
      the system for circulating a fluid,
      the connection system for establishing a closed loop,
      the inlet/outlet for fluids,
      the control means,
      the filtering means;
   c) filling of the apparatus(es) with a sufficient amount of hydrocarbon-based fluid(s), in a way that the closed flow circulation loop be full during subsequent circulation, and such that said closed flow circulation loop is full of said hydrocarbon-based fluid(s);
   d) circulation through the loop of the hydrocarbon-based fluid(s);
   e) heat up the circulating hydrocarbon-based fluid(s) to a temperature comprised between 100° C. and 600° C.;
   f) set up the pressure of the circulating hydrocarbon-based fluid(s) to a value comprised between 1 bar and 50 bar;
   g) circulation of the hydrocarbon-based fluid(s) for a time sufficient to clean the apparatus(es) of the material to be removed, comprised of between 20 minutes and 7 days, at temperature comprised between 100° C. and 600° C. and a pressure comprised between 1 bar and 50 bar, with the pressure and temperature being effective in solubilizing the material to be removed;

h) monitoring of the status of cleaning operations, as to determine cleaning time, by performing chemical and/or physical analysis;

i) removal of the circulated hydrocarbon-based fluid(s).

2. Method according to claim 1, characterized by a plant externally connected to the apparatus(es) to be cleaned by means of a closed loop comprising the apparatus(es) to be cleaned and the plant itself, such plant having all the components suitable of operating at a temperature comprised between 100° C. and 600° C. and a pressure comprised between 2 bar and 80 bar.

3. Method according to claim 1, characterized by a mobile, skid mounted plant.

4. Method according to claim 1, characterized by a plant comprised of:
- a vessel,
- a pump connected to said vessel,
- a heating system for the vessel, internal or external to said vessel, comprised of a heating medium and/or a heater selected from the group of: electric heater, fuel heater, heat exchanger, steam, heat transfer fluid, and a fluid having a temperature>100° C.,
- an inlet system for hydrocarbon-based fluid or mixtures of hydrocarbon-based fluids, for allowing introduction of said hydrocarbon-based fluid(s) inside the loop,
- a connection system for closing the loop comprising the vessel, the pump and the apparatus(es) to be cleaned,
- a discharge system for cleaning fluids, for allowing removal of cleaning fluids from the loop,
- gauges and/or controllers of temperature and/or pressure and/or level and/or oxygen and/or explosivity, which sensors are located inside the vessel,
- valves, piping for connecting all the various parts of the plant,
- a flow reversion system,
- a filtering system;
- and wherein the heated up, circulating hydrocarbon-based fluid(s) is maintained at a temperature between 150° C. and 500° C. and at a pressure of between 10 and 50 bar.

5. Method according to claim 1, characterized by a plant comprised of:
- a heat exchanger, connected on one side with the apparatus(es) to be cleaned and on the other side to a heating system,
- a pump connected to the heat exchanger,
- a heating system for the heat exchanger, internal or external to the heat exchanger itself, comprised of a heating medium and/or a heater selected from the group of electric heater, fuel heater, heat exchanger, steam, heat transfer fluid, a fluid having a temperature>100° C.,
- an inlet system for hydrocarbon-based fluid or mixtures of hydrocarbon-based fluids, for allowing introduction of said hydrocarbon-based fluid(s) inside the loop,
- a connection system for closing the loop comprising the heat exchanger, the pump and the apparatus(es) to be cleaned,
- a discharge system for cleaning fluids, for allowing removal of cleaning fluids from the loop,
- gauges and/or controllers of temperature and/or pressure and/or oxygen and/or explosivity, which sensors are located inside the loop,
- valves, piping for connecting all the various parts of the plant,
- a flow reversion system,
- a filtering system.

6. Method according to claim 1, characterized by a plant comprised of:
- a pump connected to the apparatus(es) to be cleaned,
- a stream flowing in the apparatus(es) to be cleaned of hydrocarbon based fluid(s) having a temperature>100° C.,
- an inlet system for hydrocarbon-based fluid or mixtures of hydrocarbon-based fluids and/or their fluids under present invention, for allowing injection of said hydrocarbon-based fluid(s) inside the loop,
- a connection system for closing the loop comprising the pump and the apparatus(es) to be cleaned, selected from the group of metal pipeline, metal flexible hose,
- a discharge system for cleaning fluids, for allowing removal of cleaning fluids from the loop,
- gauges and/or controllers of temperature and/or pressure and/or oxygen and/or explosivity, which sensors are located inside the loop,
- valves, piping for connecting all the various parts of the plant,
- a flow reversion system,
- a filtering system.

7. Method according to claim 1, characterized by having the apparatus(es) to be cleaned connected inside the chemical or hydrocarbon processing plant which contains such apparatus(es) by establishing a closed flow circulation loop which effectively comprises such apparatus(es) and a heating medium and/or a heater, which are part of the same chemical or hydrocarbon processing plant which contains the apparatus(es) to be cleaned.

8. Method according to claim 1, characterized by having the apparatus(es) to be cleaned connected inside the chemical or hydrocarbon processing plant which contains such apparatus(es) by establishing a closed flow circulation loop which effectively comprises such apparatus(es) and a heating medium and/or a heater, which are part of a different chemical or hydrocarbon processing plant and are connected in any suitable way with the apparatus(es) to be cleaned.

9. Method according to claim 1, characterized by having the heating means selected from the following group: fuel heater, electric heater, heat exchanger, steam, heat transfer fluid, a fluid having a temperature>100° C.

10. Method according to claim 1, characterized by having the chemical or hydrocarbon processing plant which contains the apparatus(es) to be cleaned selected from the following group: Topping, Vacuum, Visbreaking, Fluid Catalytic Cracking, RCC Fluid Catalytic Cracking, Hydrotreating, Hydrofining, Reforming, Coking, Hydrocracking, Thermal Cracking, Deasphalting, Alkylation, Isomerization, Ethylene, Butadiene, Phenol, Cumene, Demetallization, Dewaxing, Flexicoking, Flexicracking, GO-Fining, Isocracking, LC-Fining, Magnaforming, Lube Isocracking, Lube oil dewaxing, Platforming, Resid Oil Supercritical Extraction (ROSE), Residfining, Residue thermal cracking, Selective Yield Delayed Coking (SYDEC), Solvahl, Fluid Deasphalting, Unicracking, Alpha Olefins, BTX aromatic, Alkylbenzene, Caprolactam, Dimethyl terephthalate, Polyethylene, Polypropylene, Polystyrene, PVC, Styrene, Vinyl Chloride Monomer, Xylene Isomerization, Styrene-Butadiene Rubber (SBR), Nitrilic-Butadiene Rubber (NBR), Acrylonitrile, Acrylonitrile-Styrene-Butadiene (ABS), and Toluendiisocyanate (TDI).

11. Method according to claim 1, characterized by having apparatus(es) to be cleaned selected from the following group: heat exchanger, distillation column, heater, reboiler, pipeline, filter, pump, reactor, vessel, desalter, extractor, and separator.

12. Method according to claim 1, characterized by having hydrocarbon-based fluid derived from crude oil or any chemical or hydrocarbon processing plant, selected from the following group: crude oil, gasoline, gas oil, virgin naphtha, kerosene, light cycle oil from FCC, decant oil from FCC, methyl-tert-butyl-ether, benzene, toluene, xylenes, cumene, methanol, cyclohexane, ethylbenzene, linear alkylbenzene, dimethylterephtalate, phtalic anhydride, styrene, tert-amyl-methyl-ether, ethanol, dimethylformamide, dioctylphtalate, isopropyl alcohol, butyl alcohol, allyl alcohol, butylglycol, metyiglycol, ethyl-tert-butyl-ether, ethanolamines, acetone, octyl alcohol, methyl-ethyl-ketone, methyl-isobutyl-ketone, and any mixture thereof.

13. Method according to claim 1 characterized by monitoring cleaning operations by performing and evaluating chemical analysis on the circulating fluid, selected from the following group: viscosity (ASTM D 445); density (ASTM D1298); distillation (ASTM D86); Conradson Carbon Residue (CCR) (ASTM D4530 or D 189); sediments by hot filtration (IP 375); sediments for extraction (ASTM D473); ash content (ASTM D482); and asphaltene content (IP143).

14. Method according to claim 1 characterized by monitoring cleaning operations by evaluating physical parameters on the circulation loop, selected from the following group: heat transfer rate, fouling factor, pressure, and temperature.

15. Method according to claim 1 characterized by performing circulation until the difference between two successive evaluations during monitoring is in the range of +/−5%.

16. Method according to claim 1 characterized by further including the step of introduction of a second hydrocarbon-based fluid after filling the closed loop with the first hydrocarbon-based fluid.

17. Method according to claim 16, wherein the ratio between the first hydrocarbon-based fluid and the second hydrocarbon-based fluid is between 99.9% and 90% by volume.

18. Method according to claim 16, wherein the second hydrocarbon-based fluid is selected from the following group: polymetacrylates, polyisobutylene succinimmides, polyisobutylene succinates; laurylacrylate/hydroxyethyl-metacrylate copolymer; alkylarylsulfonates, alcanolamine-alkylarylsulfonates and alkylarylsulfonic acids; substituted amines, where the substituent is an hydrocarbon containing at least 8 carbon atoms; acylated compounds containing nitrogen and having a substituent with at least 10 aliphatic carbon atoms, such substituent being obtained by reaction of an acylant carboxylic acid with at least an aminic compound containing at least a group —NH—, said acylant agent being joined to said aminic compound by way of a imido, amido, amidine or acyloxyammonium bridge; nitrogen containing condensated compounds of a phenol, an aldehyde or an aminic compound, having at least a group —NH—; esters of a substituted carboxylic acid; hydrocarbyl substituted phenols; alcoxylated derivatives of an alcohol, a phenol or an amine; phtalates; organic phosphates; oleic acids esters; and polyamines.

19. Method according to claim 16, wherein the second hydrocarbon-based fluid is preferably selected from the following group: glycol of general formula $CH_2OH—(CH)_n$ $OH_n—CH_2OH$ where n=0-10; glycol ethers of general formula $R_1—O—CH_2—CH_2—O—R_2$ where $R_1$ is an hydrocarbyl substituent $C_1$-$C_{20}$ and $R_2$ is H atom or an hydrocarbyl substituent $C_1$-$C_{20}$; glycol esters of general formula $R_1—O—O—CH_2—CH_2—O—O—R_2$ where $R_1$ is an hydrocarbyl substituent $C_1$-$C_{20}$ and $R_2$ is H atom or an hydrocarbyl substituent $C_1$-$C_{20}$; glycol ethers-esters of general formula $R_1—O—CH_2—CH_2—O—O—R_2$ where $R_1$ and $R_2$ are an hydrocarbyl substituent $C_1$-$C_{20}$.

20. Method according to claim 16, wherein the second hydrocarbon-based fluid is selected from the following group: ethers of general formula $R_1—O—R_2$ where $R_1$ or $R_2$ is an hydrocarbyl substituent $C_1$-$C_{20}$; substituted benzenes of general formula

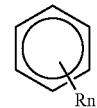

where n=1-6 and R can be indifferently H atom, —OH group, —CHO group, —NH$_2$ group, the same or different hydrocarbyl substituent $C_1$-$C_{30}$; ketons of general formula $R_1—CO—R_2$ where $R_1$ or $R_2$ is an hydrocarbyl substituent $C_1$-$C_{20}$; anhydrides of general formula $R_1—CO—O—CO—R_2$, included those where $R_1$ and $R_2$ are bound together to form cyclic anhydrides, where $R_1$ or $R_2$ is an hydrocarbyl substituent $C_1$-$C_{20}$; amides of general formula

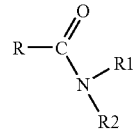

where R, $R_1$, $R_2$ are indifferently H atom or an hydrocarbyl substituent $C_1$-$C_{20}$; hetherocyclic compounds, containing from 0 to 3 hydrocarbyl substituent $C_1$-$C_{20}$.

21. Method according to claim 16, wherein the second hydrocarbon-based fluid is selected from the following group: furans, pyrrols, imidazoles, triazoles, oxazoles, thiazoles, oxadiazoles, pyranes, pyridine, pyridazine, pyrimidine, pyrazine, pyperazine, piperidine, triazines, oxazines, oxadiazines, morpholine, indane, indenes, benzofuranes, benzothiophenes, indoles, indazole, indoxazine, benzoxazole, anthranile, benzopyrane, coumarines, quinolines, benzopyrones, cinnoline, quinazoline, naphthyridine, pyrido-pyridine, benzoxazines, carbazole, xanthene, acrydine, purine, benzopyrroles, cyclic amides, benzoquinolines, benzocarbazoles, indoline, and benzotriazoles.

22. Method according to claim 16, wherein the second hydrocarbon-based fluid is selected from the following group: methanol, ethanol, propanol, isopropanol, butanol, isobutanol, methylglycol monomethylether, butylglycol monobutylether, toluene, aliphatic amines $C_8^+$ ethoxylated with at least 6 moles ethylene oxide, arylsulfonates, benzene, diphenyl, phenanthrene, nonylphenol, 1-methyl-2-pyrrolidinone, diethyl ether, dimethylformamide (DMF), tetrahydrofuran (THF), ethylenediamine, diethylamine, triethylamine, propylamine, 1-(3-aminopropyl)-2-pyrrolidone, 1-(3-aminopropyl)imidazole, 2-(2-aminoethylamino)ethanol, isopropylamine, cumene,1,3,5 trimethylbenzene, 1,2,4 trimethylbenzene, maleic anhydride, p-toluidine,o-toluidine, dipropylamine, diphenyl ether, hexamethylbenzene, propylbenzene, cyclohexylamine, 1-isopropyl-4-methyl-benzene, 1,2,3,5 tetramethylbenzene, hexanol, morpholine, o-xylene, m-xylene, p-xylene, butylamine, methylamine, mesitylene, examine, succinic anhydride, decahydronaphthalene, ethylbenzene, 1,2 dimethylnaphthalene, 1,6 dimethylnaphthalene, p-cymene, ethyl ether, isopropyl ether, etoxybenzene, phenyl ether, acetophenone, monoethanolamine (MEA), diethanolamine (DEA), triethanolamine (TEA), diethyleneglycol, triethyleneglycol, tetraethyleneglycol, dodecylbenzene, lauryl alcohol, myristyl alcohol, dibutylphthalate, dioctylphthalate, diisooctylphthalate, dinonylphthalate, didecylphthalate, methylethylketone (MEK), methylisobutylketone (MIBK), methyl-tert-butyl-ether (MTBE), cyclohexane, methyl- or ethyl-esters of fatty acids achieved by esterification of vegetal and/or animal oils (biodiesel).

23. The method of claim 16 characterized by further including the step of repeating the steps c) through i) relative to said surface following a flushing of previously introduced hydrocarbon-based fluid or fluids and replacement with a newly introduced hydrocarbon-based fluid(s) selected from a group comprising said first hydrocarbon fluid, said second hydrocarbon fluid or a combination thereof.

24. Method according to claim 1 characterized by further including the step of circulation of the hydrocarbon-based fluid under conditions of temperature and pressure sufficient to maintain said fluid at near or above its critical point.

25. Method according to claim 1 further comprising introducing a second hydrocarbon-based fluid while maintaining the loop full and characterized by further including the step of circulation of the second hydrocarbon-based fluid under conditions of temperature and pressure sufficient to maintain said second fluid at near or above its critical point.

26. Method according to claim 25, wherein the second hydrocarbon-based fluid is selected from the following group: dimethylamine, ethylamine, ethyl formate, methyl acetate, dimethylformamide, propanol, propylamine, isopropylamine, trimethylamine, tetrahydrofuran, ethyl vinyl ether, ethyl acetate, propyl formate, butanol, methyl propanol, diethyl ether, methyl propyl ether, isopropyl methyl ether, diethyl sulfide, butylamine, isobutylamine, diethylamine, cyclopentanol, 2-methyltetrahydrofuran, tetrahydropyran, pentanal, isobutyl formate, propyl acetate, butyl methyl ether, tert-butyl methyl ether, ethyl propyl ether, methylpyridines, cyclohexanone, cyclohexane, methylcyclopentane, cyclohexanol, hexanal, pentyl formate, isobutyl acetate, 2-ethoxyethyl acetate, methyl pentyl ether, dipropyl ether, diisopropyl ether, hexanol, methyl pentanols, triethylamine, dipropylamine, diisopropylamine, benzaldehyde, toluene, cresols, benzyl alcohol, methylanilines, dimethylpyridines, furfural, pyridine, methylcyclohexane, heptanol, acetophenone, ethylbenzene, xylenes, ethylphenols, xylenols, anilines, dimethylaniline, ethylaniline, octanenitrile, ethyl propanoate, methyl butanoate, methyl isobutanoate, propyl propanoate, ethyl 2-methyl propanoate, methyl pentanoate, propyl 3-methylbutanoate, octanoles, 4-methyl-3-heptanol, 5-methyl-3-heptanol, 2-ethyl-1-hexanol, dibutyl ether, di-tert-butyl ether, dibutylamine, diisobutylamine, quinoline, isoquinoline, indan, cumene, propylbenzene, 1, 2, 3-trimethylbenzene, 1, 2, 4, -trimethylbenzene, mesitylene, o-toluidine, N,N-dimethyl-o-toluidine, nonanols, naphthalene, butylbenzene, isobutylbenzene, cymenes, p-diethylbenzene, 1,2, 4,5-tetramethylbenzene, decahydronaphthalene, decanol, 1-methylnaphthalene, carbazole, diphenyl, hexamethylbenzene, dodecanols, diphenylmethane, tridecanols, tetradecanols, hexadecanols, heptadecanols, terphenyls, octadecanols, and eicosanols.

27. Method according to claim 1 characterized by performing simultaneous cleaning of multiple apparatuses, also of different type.

28. Method according to claim 1 characterized by improved furnace inlet temperature of the chemical or hydrocarbon processing plant.

29. Method according to claim 1 characterized by further including the step of isolation of the apparatus(es) to be cleaned from the other process apparatus(es), before the step of establishment of a closed flow circulation loop.

30. Method according to claim 1 characterized by further including the step of reduction of temperature and pressure of the circulating hydrocarbon-based fluid before the step of removal of such fluid.

31. Method according to claim 1 characterized by further including the step of recover and/or reutilization of the discharged hydrocarbon-based fluid.

32. Method according to claim 1 characterized by further including the step of repeating of the steps c) through i).

33. Method according to claim 1 characterized by further including the following steps after removal of the circulating hydrocarbon-based fluid(s):
   a) introduction of water to the closed flow circulation loop;
   b) introduction of a water-soluble fluid in any suitable point of the closed loop, in order to form a water solution;
   c) start circulation of the water solution;
   d) heating up of the circulating water solution at a temperature comprised between 60° C. and 150° C.;
   e) setting up the pressure of the circulating water solution to a value comprised between 1 bar and 50 bar;
   f) circulation of the water solution for a time sufficient to degass the apparatus(es), comprised between 20 minutes and 7 days, at temperature comprised between 60° C. and 150° C. and a pressure comprised between 1 bar and 50 bar;
   g) monitoring of the status of cleaning operations, as to determine cleaning time, by evaluating the total hydrocarbon content of the circulating fluid;
   h) stopping of the circulation when total hydrocarbon content of the circulating water solution varies within +/−1% between two successive evaluations; and
   i) removal of the circulating water solution.

34. Method according to claim 33 characterized by further including the step of reducing temperature and pressure of the circulating water solution in order to allow subsequent solution discharge.

35. Method according to claim 33 characterized by further including the step of recovering and reutilizing the water solution.

36. Method according to claim 33 characterized by further including the step of repeating the steps a) through i).

37. Method according to claim 33 characterized by further including the step of repeating the steps a) and c) through i).

38. Method according to claim 33 characterized by a water-soluble fluid selected from the following group: non-ionic surfactants, anionic surfactants.

39. Method according to claim 33 characterized by a water-soluble fluid selected from the following group: alkyl-, aryl-, or alkylaryl-benzensulphonates of general formula $RC_6H_4SO_3M$ wherein R is an hydrocarbyl substituent $C_8$-$C_{20}$ and M is ion H, Na, Ca, ammonium, triethanolammonium, isopropylammonium; dialkylsulfosuccinates of general formula $RO_2CCH_2CH(SO_3Na)CO_2R$ wherein R is an hydrocarbyl substituent $C_2$-$C_{20}$; alkylsulfates of general formula $ROSO_3M$ wherein R is an hydrocarbyl substituent $C_5$-$C_{20}$ and M is ion sodium, ammonium, triethanolammonium; ethoxylated and sulphated alcohols of general formula $R$—($-OCH_2CH2-$)$_n$—$OSO_3M$ wherein R is an hydrocarbyl substituent $C_5$-$C_{20}$, n=1-5 and M is ion sodium, ammonium, triethanolammonium; ethoxylated alcohols of general formula $R$—($-O-CH_2CH_2-$)$_n$—$OH$ wherein R is an hydrocarbyl substituent $C_5$-$C_{30}$, n=1-30; mono-and di-fatty acids glyceric esters wherein acid contains an hydrocarbyl substituent $C_{10}$-$C_{40}$; mono- and di-ethanolamides of fatty acids of general formula $RCONHC_2H_4OOCR$ and $RCON(C_2H_4OH)C_2H_4OOCR$ wherein R is an hydrocarbyl substituent $C_{10}$-$C_{40}$; surfactants of poly(oxyetylene-co-oxypropylene), also known as block polymer, having molecular weight of 50-10000; mono-, di- and poly-aliphatic amines derived from fatty acids, such as $RNHCH_2CH_2CH_2NH_2$ wherein R is an hydrocarbyl substituent $C_{10}$-$C_{40}$; ethoxylated alkylamines of general formula

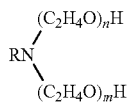

wherein m+n=2-40; alkoxylated ethylendiamines of general formula

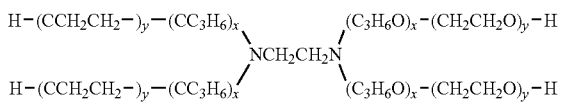

wherein x and y=4-100.

40. Method according to claim 33 characterized by a water-soluble fluid selected from the following group: sodium-dioctylsulfoccinate, oleine ethoxylated with 4-20 moles ethylene oxide.

41. Method according to claim 1 for cleaning internal surfaces of a hydrocarbon processing plant, to remove undesirable materials selected from the group of heavy organic compounds, foulants, sludge, and coke.

42. The method of claim 1 characterized by further including the step of repeating the steps c) through i) relative to said surface following a flushing of a first introduced first hydrocarbon-based fluid and replacement with a second introduced first hydrocarbon-based fluid.

43. The method of claim 1 wherein products are distilled during the circulation and the distilled products are condensed and sent back to the cleaning circulation loop.

44. The method of claim 1 wherein the hydrocarbon-based fluid is circulated at near critical or supercritical conditions within the closed loop system and while under the pressure of from 1 bar to 50 bar.

45. The method of claim 1 wherein the temperature is from 150° C. to 600° C.

46. The method of claim 1 further comprising start-up of processing in the chemical or hydrocarbon processing plant without opening the processing plant at any point following completion of the cleaning time up until said start-up.

47. Method according to claim 1 for cleaning internal surfaces of a chemical plant, to remove undesirable materials selected from the group of heavy organic compounds, foulants, sludge, and coke.

48. A method for cleaning a surface of an apparatus to remove heavy organic compounds, foulants, sludge or coke, as material to be removed in a chemical process or hydrocarbon process system, comprising:
   a) flushing a fluid from the chemical or hydrocarbon process system which includes said apparatus;
   b) setting up a closed flow circulation loop which includes said apparatus;
   c) introducing a first hydrocarbon-based fluid to the closed flow circulation loop such that said introduced first hydrocarbon-based fluid fills said closed flow circulation loop, and such that said closed flow circulation loop is full of said first hydrocarbon-based fluid;
   d) passing the first hydrocarbon-based fluid across the surface of said at least one apparatus while maintaining said first hydrocarbon-based fluid at a temperature of from 100° C. to 600° C. and a pressure of from 1 to 50 bar;
   e) recirculating said first hydrocarbon-based fluid through said closed flow circulation loop and over the surface of said apparatus multiple times to clean the surface of said apparatus of the material to be removed, with the pressure and temperature being effective in solubilizing the material to be removed.

49. The method of claim 48 characterized by further including the step of repeating the steps c) through e) relative to said surface following a flushing of a first introduced first hydrocarbon-based fluid and replacement with a second introduced first and/or second hydrocarbon-based fluid and mixtures thereof.

50. The method of claim 48, further comprising (f) introducing a second hydrocarbon-based fluid, which is different from the first hydrocarbon-based fluid, into the closed flow circulation loop.

51. The method of claim 50 wherein said first and/or second hydrocarbon-based fluid is utilized at near critical or supercritical conditions within the closed loop system and while under the pressure of from 1 bar to 50 bar.

52. The method of claim 50 characterized by further including the step of repeating one of step sets (c) to (e) and (c) to (f) relative to said surface following a flushing of previously introduced hydrocarbon-based fluid or fluids and replacement with a newly introduced hydrocarbon-based fluid selected from a group comprising said first and second hydrocarbon-based fluids and mixtures thereof.

53. The method of claim 50, wherein the second hydrocarbon-based fluid is introduced into the closed flow circulation loop, subsequent to the introduction of said first hydrocarbon-based fluid.

54. The method of claim 50, wherein the second hydrocarbon-based fluid is introduced into the closed flow circulation loop at a different location than the first hydrocarbon-based fluid.

55. The method of claim 50, wherein, during the introduction of said second type of hydrocarbon-based fluid, the closed loop is opened temporarily for removal of an amount of said first hydrocarbon-based fluid which is displaced by said second hydrocarbon-based fluid.

56. The method of claim 48, wherein step a) includes flushing of feedstock from the process system to a storage area prior to introduction of said first hydrocarbon-based fluid.

57. The method of claim 48, wherein said closed flow circulation loop is partly formed by a mobile unit which is brought to a location of the chemical process or hydrocarbon process system.

58. The method of claim 57 wherein a heater that is utilized in the chemical process or hydrocarbon process system to heat system fluid is relied upon to heat said first hydrocarbon-based fluid to from 150° C. to 500° C.

59. The method of claim 48, wherein said first hydrocarbon-based fluid is utilized at near critical or supercritical conditions within the closed loop system and while under the pressure of from 1 bar to 50 bar.

60. The method of claim 59, wherein said first hydrocarbon-based fluid has a critical pressure of <3.5 MPa.

61. The method of claim 48 further comprising introducing a swelling agent together with the first hydrocarbon-based fluid to the closed flow circulation loop.

62. The method of claim 48 wherein said closed flow circulation loop includes multiple apparatuses each having a surface to be cleaned by said recirculating first hydrocarbon-based fluid.

63. The method of claim 48 further comprising a pump and filter positioned in line within said closed flow circulation loop and wherein said apparatus to be cleaned within said closed flow circulation loop includes a bottom of a distillation column and wherein said distillation column is filled up to a level to assure suction head of said pump which is associated with said distillation column in normal operation and to enable said closed loop to be retained in a hydrocarbon-based fluid(s) full state.

64. The method of claim 48 wherein the first hydrocarbon-based fluid comprises methyl-tert-butyl-ether (MTBE).

65. The method of claim 48 further comprising introducing a second hydrocarbon-based fluid, which is different from the first hydrocarbon-based fluid, into the closed flow circulation loop, and wherein at least one of the first and second hydrocarbon-based fluids is selected from the group comprising methyl-tert-butyl-ether (MTBE), xylene, toluene and combinations thereof.

66. The method of claim 48 further comprising introducing a second hydrocarbon-based fluid, which is different from the first hydrocarbon-based fluid, into the closed flow circulation loop, and said second hydrocarbon-based fluid comprising a glycol or a glycol derivative.

67. The method of claim 48 further comprising, after cleaning with said hydrocarbon-based fluid(s), flushing said closed flow circulation loop and carrying out a degassing operation in said closed flow circulation loop which comprises providing to said closed flow circulation loop with water, introducing a water soluble fluid while heating said water with a heater utilized to heat said hydrocarbon-based fluid(s) during recirculation and maintaining a pressure state in said closed flow circulation loop of 1 to 50 bar.

68. The method of claim 48 further comprising introducing a second, different hydrocarbon-based fluid and wherein said closed loop is totally full of said first hydrocarbon-based fluid such that said closed loop is opened temporarily for removal of first hydrocarbon-based fluid upon introduction of said second hydrocarbon-based fluid.

69. The method of claim 48 further comprising removing the first and/or second hydrocarbon-based fluid following recirculation in step (e) and using the removed hydrocarbon-based fluid in a step selected from the group consisting of (i) and (ii):
  (i) a blending step wherein the first and/or second hydrocarbon-based fluid and/or mixtures thereof are utilized as a blending component for fuel oil; and
  (ii) a reprocessing step wherein the first and/or second hydrocarbon-based fluid and/or mixtures thereof are processed together with feedstock in a hydrocarbon processing plant.

70. The method of claim 48 wherein products are distilled during the circulation and the distilled products are condensed and sent back to the cleaning circulation loop.

71. The method of claim 48 wherein said first hydrocarbon-based fluid is circulated at near critical or supercritical conditions within the closed loop system and while under the pressure of from 1 bar to 50 bar.

72. The method of claim 48 wherein the temperature is from 150° C. to 600° C.

73. The method of claim 48 further comprising start-up of processing in the chemical or hydrocarbon processing plant without opening the processing plant at any point following completion of the cleaning time up until said start-up.

74. A method for cleaning a surface of an apparatus to remove heavy organic compounds, foulants, sludge or coke, as material to be removed in a chemical process or hydrocarbon process system, comprising:
  a) setting up a closed flow circulation loop which includes said apparatus;
  b) introducing a first hydrocarbon-based fluid to the closed flow circulation loop that includes the surface of said apparatus to be cleaned within said closed flow circulation loop;
  c) independently of said first hydrocarbon-based fluid introduction, introducing a second hydrocarbon-based fluid to the closed flow circulation loop that includes the surface of said apparatus to be cleaned within said closed flow circulation loop such that said introduced first and second hydrocarbon-based fluid fills said closed flow circulation loop and such that the closed flow circulation loop is full of said first and second hydrocarbon-based fluids following introduction of said first and second hydrocarbon-based fluids to said closed flow circulation loop;
  d) passing the first and second hydrocarbon-based fluids across the surface of said at least one apparatus while at a temperature of from 100° C. to 600° C. and while at a pressure of from 1 bar to 50 bar;
  e) recirculating said first and second hydrocarbon-based fluids through said closed flow circulation loop and over the surface of said apparatus multiple times to clean the surface of said apparatus of the material to be removed, with the pressure and temperature being effective in solubilizing the material to be removed during the recirculating.

75. The method of claim 74 characterized by further including flushing previously introduced hydrocarbon-based fluid or fluids and replacement with a newly introduced hydrocarbon-based fluid selected from a group comprising: said first hydrocarbon fluid, said second hydrocarbon-based fluid or a combination thereof.

76. The method of claim 74 wherein the second hydrocarbon-based cleaning fluid is introduced into the closed flow circulation loop, subsequent to the introduction of said first hydrocarbon-based cleaning fluid.

77. The method of claim 74 wherein the second hydrocarbon-based fluid is introduced into the closed flow circulation loop at a different location than the first hydrocarbon-based fluid.

78. The method of claim 74 wherein products are distilled during the circulation and the distilled products are condensed and sent back to the cleaning circulation loop.

79. The method of claim 74 wherein said first and/or hydrocarbon-based fluids are circulated at near critical or supercritical conditions within the closed loop system and while under the pressure of from 1 bar to 50 bar.

80. The method of claim 74 wherein the temperature is from 150° C. to 600° C.

81. The method of claim 74 further comprising start-up of processing in the chemical or hydrocarbon processing plant without opening the processing plant at any point following completion of the cleaning time up until said start-up.

82. The method of claim 74 wherein the material to be removed has a boiling point or melting point>100° C.

83. The method of claim 82 wherein the material to be removed during the recirculating is deposited coke.

* * * * *